(12) United States Patent
Hu

(10) Patent No.: US 12,202,432 B2
(45) Date of Patent: Jan. 21, 2025

(54) RESTRAINT DEVICE LOCALIZATION

(71) Applicant: NVIDIA Corporation, Santa Clara, CA (US)

(72) Inventor: Feng Hu, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 732 days.

(21) Appl. No.: 17/137,256

(22) Filed: Dec. 29, 2020

(65) Prior Publication Data

US 2022/0203930 A1 Jun. 30, 2022

(51) Int. Cl.
*B60R 22/48* (2006.01)
*G06T 7/60* (2017.01)
*G06T 7/73* (2017.01)

(52) U.S. Cl.
CPC ............... *B60R 22/48* (2013.01); *G06T 7/60* (2013.01); *G06T 7/75* (2017.01);
(Continued)

(58) Field of Classification Search
CPC .............. B60R 22/48; B60R 2022/485; B60R 2022/4891; B60R 2022/4808; G06T 7/60;
(Continued)

(56) References Cited

U.S. PATENT DOCUMENTS 10,303,961 B1 5/2019 Stoffel et al.
10,885,698 B2 1/2021 Muthler et al.
(Continued)

FOREIGN PATENT DOCUMENTS

CN 102555982 A 7/2012
CN 202518219 U 11/2012
(Continued)

OTHER PUBLICATIONS

Center for Disease Control and Prevention, "Seat Belts: Get the Facts," retrieved from https://www.cdc.gov/transportationsafety/seatbelts/facts.html, Oct. 7, 2020, 2 pages.
(Continued)

*Primary Examiner* — Nay Tun
(74) *Attorney, Agent, or Firm* — Davis Wright Tremaine LLP

(57) ABSTRACT

Systems and methods are disclosed related to restraint device (e.g., seatbelt) localization. In one embodiment, the disclosure relates to systems and methods for seatbelt detection and modeling. A vehicle may be occupied by one or more occupants wearing one or more seatbelts. A camera or other sensor is placed within the vehicle to capture images of the one or more occupants. A system analyzes the images to detect and model seatbelts depicted in the images. Specifically, the system may scan the images and areas of the images that may correspond to seatbelts. The system may assemble candidate areas of the images that may correspond to seatbelts, and refine the candidate areas based on various constraints. The system may build models based on the refined candidate areas that indicate the seatbelts. The system may visualize the models indicating the seatbelts using the images.

20 Claims, 17 Drawing Sheets

(52) U.S. Cl.
CPC . *B60R 2022/485* (2013.01); *B60R 2022/4891* (2013.01); *G06T 2207/20081* (2013.01); *G06T 2207/20084* (2013.01); *G06T 2207/30268* (2013.01)

(58) Field of Classification Search
CPC .............. G06T 7/75; G06T 2207/20081; G06T 2207/20084; G06T 2207/30268; G06T 7/73
See application file for complete search history.

(56) References Cited

U.S. PATENT DOCUMENTS

| | | | | |
|---|---|---|---|---|
| 10,953,850 | B1* | 3/2021 | Pertsel | B60R 21/01538 |
| 10,962,939 | B1* | 3/2021 | Das | G06F 16/3344 |
| 11,193,312 | B1 | 12/2021 | Weng | |
| 11,295,471 | B1 | 4/2022 | Bhuta et al. | |
| 11,507,800 | B2* | 11/2022 | Lin | G06F 16/5854 |
| 2010/0086174 | A1* | 4/2010 | Kmiecik | G06T 7/90 382/199 |
| 2010/0266161 | A1* | 10/2010 | Kmiecik | G01C 21/32 382/113 |
| 2012/0314935 | A1* | 12/2012 | Cheng | G06V 20/20 382/154 |
| 2014/0270482 | A1* | 9/2014 | Chakraborty | G06V 20/10 382/154 |
| 2015/0063709 | A1* | 3/2015 | Wang | G06T 7/12 382/199 |
| 2015/0251618 | A1* | 9/2015 | Ghannam | B60R 21/01544 340/457.1 |
| 2016/0046261 | A1* | 2/2016 | Gulash | G06T 17/20 701/45 |
| 2016/0063720 | A1 | 3/2016 | Han et al. | |
| 2016/0159320 | A1* | 6/2016 | Andreen | B60R 22/48 382/103 |
| 2016/0202756 | A1 | 7/2016 | Wu et al. | |
| 2016/0210533 | A1* | 7/2016 | Kiapour | G06V 30/19147 |
| 2017/0043712 | A1 | 2/2017 | Paszkowicz et al. | |
| 2018/0211122 | A1 | 7/2018 | Amico et al. | |
| 2018/0326944 | A1* | 11/2018 | Cech | G01S 11/00 |
| 2019/0080149 | A1 | 3/2019 | Gernoth et al. | |
| 2019/0197326 | A1* | 6/2019 | Ohno | B60R 22/12 |
| 2019/0213429 | A1 | 7/2019 | Sicconi et al. | |
| 2019/0225186 | A1* | 7/2019 | Szawarski | G06V 20/597 |
| 2019/0258263 | A1* | 8/2019 | Wendel | B60W 50/14 |
| 2019/0278108 | A1 | 9/2019 | Ang et al. | |
| 2019/0340924 | A1 | 11/2019 | Abari et al. | |
| 2020/0051318 | A1 | 2/2020 | Muthler et al. | |
| 2020/0193628 | A1* | 6/2020 | Chakraborty | G06F 18/217 |
| 2020/0231109 | A1* | 7/2020 | Baltaxe | G06N 3/08 |
| 2020/0298794 | A1* | 9/2020 | Dingli | G06F 9/3004 |
| 2020/0298796 | A1* | 9/2020 | Cech | H04N 23/90 |
| 2021/0056306 | A1 | 2/2021 | Hu et al. | |
| 2021/0086715 | A1* | 3/2021 | Baek | B60R 21/01554 |
| 2021/0104068 | A1 | 4/2021 | Marks et al. | |
| 2021/0182609 | A1 | 6/2021 | Arar et al. | |
| 2021/0182625 | A1 | 6/2021 | Arar et al. | |
| 2021/0394710 | A1 | 12/2021 | Hu et al. | |

FOREIGN PATENT DOCUMENTS

| | | |
|---|---|---|
| CN | 103552538 A | 2/2014 |
| CN | 104417490 A | 3/2015 |
| CN | 105373779 A | 3/2016 |
| CN | 105946786 A | 9/2016 |
| CN | 106446767 A | 2/2017 |
| CN | 111476224 A | 7/2020 |
| CN | 111950348 A | 11/2020 |

OTHER PUBLICATIONS

Center for Disease Control and Prevention, "Policy Impact: Seat Belts," retrieved from https://www.cdc.gov/motorvehiclesafety/seatbeltbrief/index.html, Jan. 2011, 4 pages.

Savitzky et al., "Smoothing and Differentiation of Data by Simplified Least Squares Procedures," Analytical Chemistry, 36(8): 1964, 13 pages.

Society of Automotive Engineers On-Road Automated Vehicle Standards Committee, "Taxonomy and Definitions for Terms Related to Driving Automation Systems for On-Road Motor Vehicles," Standard No. J3016-201609, issued Jan. 2014, revised Sep. 2016, 30 pages.

Society of Automotive Engineers On-Road Automated Vehicle Standards Committee, "Taxonomy and Definitions for Terms Related to Driving Automation Systems for On-Road Motor Vehicles," Standard No. J3016-201806, issued Jan. 2014, revised Jun. 2018, 35 pages.

Torr et al., "MLESAC: A New Robust Estimator with Application to Estimating Image Geometry," Computer Vision and Image Understanding, 18(1): Apr. 2000, 19 pages.

U.S. Appl. No. 16/905,418 for "Machine learning-based seatbelt detection and usage recognition using fiducial marking," filed Jun. 18, 2020.

Worldometer, "How many cars are there in the world currently?" retrieved from https://www.worldometers.info/cars/, 2016, 1 page.

Office Action for Chinese Application No. 202111628623.X, mailed Aug. 29, 2023, 26 pages.

Office Action for Chinese Application No. 202111628623.X, mailed Mar. 7, 2024, 19 pages.

Amazon, "Seat Belt Buckle Alarm Stopper," retrieved from https://www.amazon.com/seat-belt-buckle-alarm-stopper/s?k=seat+belt+buckle+alarm+stopper, (undated), 7 pages.

Hassner et al., "Effective Face Frontalization in Unconstrained Images," IEEE Conference on Computer Vision and Pattern Recognition, 2015, 10 pages.

Kahou et al., "Combining Modality Specific Deep Neural Networks for Emotion Recognition in Video," International Conference on Multimodal Interaction, 2013, 8 pages.

Liu et al., "Exploring Disentangled Feature Representation Beyond Face Identification," IEEE Conference on Computer Vision and Pattern Recognition, 2018, 10 pages.

Office Action for Chinese Application No. 202110678300.5, mailed Feb. 24, 2024, 17 pages.

Office Action for Chinese Application No. 202111628623.X, mailed Aug. 8, 2024, 16 pages.

Park et al., "Few-Shot Adaptive Gaze Estimation," 2019 IEEE/CVF International Conference on Computer Vision (ICCV), Oct. 27, 2019, 10 pages.

Yang et al., "FSA-Net: Learning Fine-Grained Structure Aggregation for Head Pose Estimation from a Single Image," IEEE Conference on Computer Vision and Pattern Recognition, 2019, 10 pages.

Zhu et al., "Face Alignment in Full Pose Range: A 3D Total Solution," IEEE Transactions on Pattern Analysis and Machine Intelligence, 2018, 14 pages.

Zhu et al., "Robust Facial Landmark Detective via Occlusion-adaptive Deep Networks," IEEE Conference on Conference Vision and Pattern Recognition, 2017, 11 pages.

\* cited by examiner (e) (f)
(g) (h)

300

RESTRAINT DEVICE LOCALIZATION

CROSS-REFERENCES TO RELATED APPLICATIONS

This application incorporates by reference for all purposes the full disclosure of co-pending U.S. patent application Ser. No. 17/005,914 filed Aug. 28, 2020, entitled "NEURAL NETWORK BASED DETERMINATION OF GAZE DIRECTION USING SPATIAL MODELS," co-pending U.S. patent application Ser. No. 17/004,252 filed Aug. 27, 2020, entitled "NEURAL NETWORK BASED FACIAL ANALYSIS USING FACIAL LANDMARKS AND ASSOCIATED CONFIDENCE VALUES," and co-pending U.S. patent application Ser. No. 16/905,418 filed Jun. 18, 2020, entitled "MACHINE LEARNING-BASED SEATBELT DETECTION AND USAGE RECOGNITION USING FIDUCIAL MARKING."

BACKGROUND

Automobiles and other vehicles and machines that transport or contain passengers or operators often have various safety features, such as seatbelts or other restraint devices. In many cases, the safety devices can be less effective or even ineffective if not used correctly. An incorrectly worn seatbelt, for example, can be significantly less effective than a correctly worn seatbelt. Various attempts have been made to improve the use of such safety devices. Some devices involve retrofitting machines, which can be difficult and expensive, especially considering the variations among machines of the same type. Generally, detecting correct use of restraint devices such as seatbelts in vehicles has many challenges and have varied success with respect to accuracy.

TECHNICAL FIELD

At least one embodiment pertains to processing resources used to identify and model one or more restraint devices from one or more images. For example, at least one embodiment pertains to processors or computing systems used to identify and model one or more restraint devices from one or more images of the one or more restraint devices according to various novel techniques described herein.

BRIEF DESCRIPTION OF THE DRAWINGS

The present systems and methods for restraint device localization are described in detail below with reference to the attached drawing figures, wherein.

DETAILED DESCRIPTION

Figure 1:
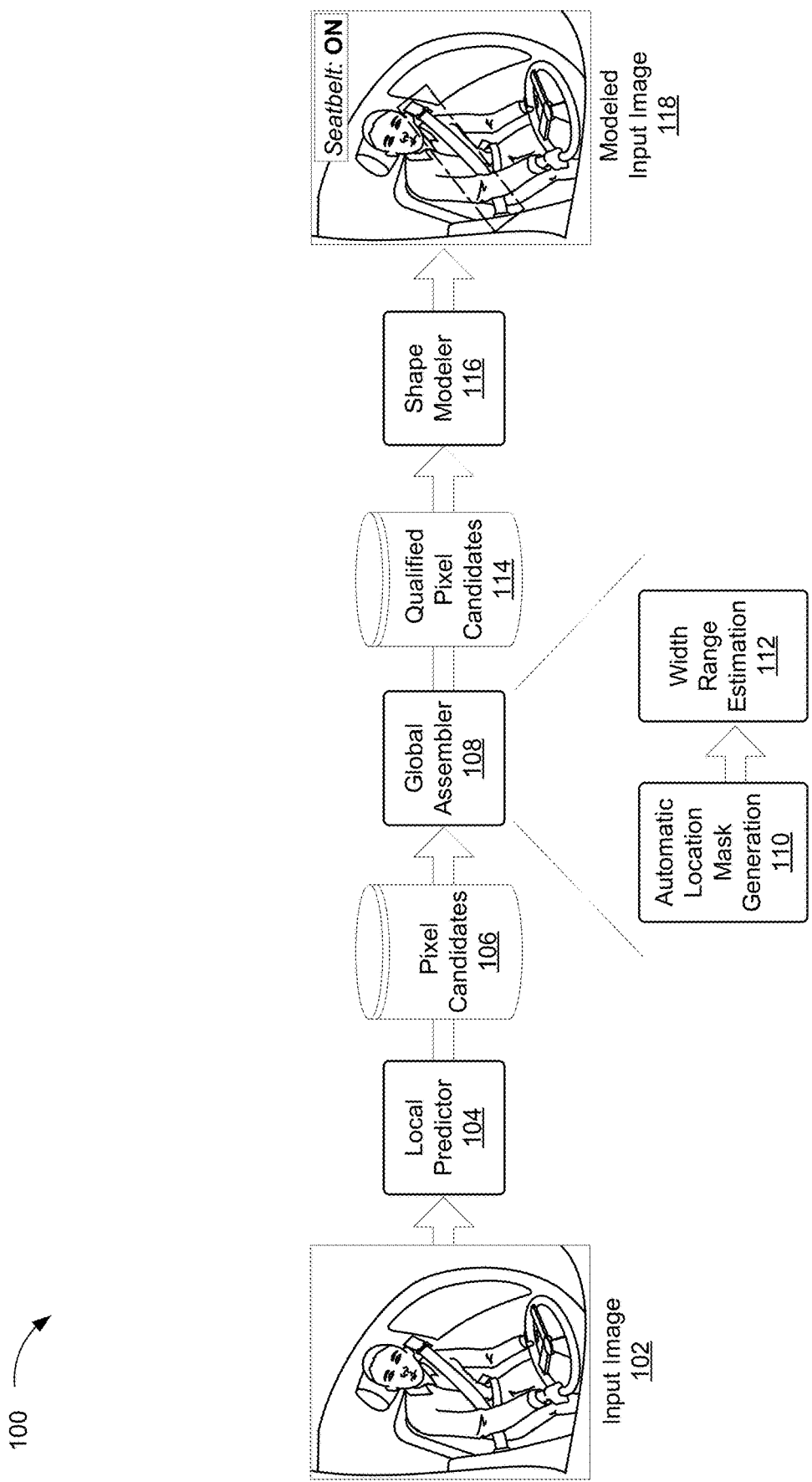
FIG. 1 illustrates an example of a system for seatbelt localization, in accordance with some embodiments of the present disclosure.

Techniques described herein provide ways of passively detecting seatbelts and other restraint devices to enable various functionality, such as detection of whether an occupant in a vehicle is wearing a seatbelt and wearing it properly. A camera that is set up in a vehicle captures an image and the image is analyzed to determine whether the occupant is wearing a seatbelt properly. Typically, a vehicle's system uses a sensory system that detects whether the seatbelt is in a locked position. However, there are instances when the sensory system can be fooled or permanently disabled. In addition, there are instances where the occupant has the seatbelt on, but is wearing it incorrectly (e.g., the seatbelt is worn behind the back). To combat this and improve traffic safety, the techniques described herein use video/images captured by a camera on board the vehicle to determine whether a seatbelt is being properly worn. The techniques are performed without having to physically modify the seatbelt itself or any existing locking sensory systems.

More specifically, a system first analyzes a captured image to classify whether pixels are a part of a seatbelt or part of the background. This classification results in the generation of a plurality of pixel candidates that are most likely a part of a seatbelt. To more accurately identify the pixels that are a part of the seatbelt, the system uses various pieces of information to correct misidentification of pixels identified as part of the seatbelt and vice versa. Such pieces of information can include: parameters/constraints such as how a seatbelt is constructed inside a vehicle, the direction in which a seatbelt should extend when locked, the physical attributes of a seatbelt, and the configurations of the camera that captured the images to assemble a more accurate set of pixels. After filtering the pixels to generate the more accurate set of pixels, the system then parameterizes the seatbelt, and models the seatbelt's shape using a high order polynomial curve, which further removes any pixels that are outliers with respect to the modeled shape and retrieves back previously incorrectly filtered out or occluded pixels. The final seatbelt curve can be used to enhance occupant safety, such as to determine whether the seatbelt is being properly worn (e.g., the seatbelt is in the locked position and is worn diagonally and across the occupant's chest).

The techniques described herein expand upon methods to improve safety features in all types of vehicles without having to modify existing vehicle systems. The techniques are able to identify which occupants in the vehicle are properly wearing a seatbelt based on video/images captured by the vehicle's on-board system and/or camera. The system not only identifies whether the driver is wearing a seatbelt properly, but can also determine whether all other occupants in the vehicle are wearing their seatbelts properly. Although the system described herein is applied to seatbelts in common occupant vehicles, the system is also applicable to other fields (e.g., construction equipment, amusement park rides, 4D movie theater seats) requiring seatbelts, safety, or other harnesses. The system may be a component of an in-vehicle occupant monitoring system (OMS).

The system may be robust and applicable to various kinds of camera sensor configurations, such as colored or infrared cameras, regular field of view or fisheye cameras. The system may operate and process images captured in various light conditions, such as low light conditions (e.g., nighttime conditions), variable light conditions (e.g., day-time conditions), and/or variations thereof. The system may determine a novel local parallel lines pattern and detect the pattern at a micro-scale within an image through one or more techniques as described herein. The system may utilize parallel computing techniques using one or more general-purpose graphics processing units (GPGPU) to efficiently determine all seatbelts for all frames of a video concurrently. The system may provide real-time monitoring of seatbelt and seatbelt usage to improve the safety of one or more occupants occupying a vehicle. The system may provide binary classification functionalities for any patches of an image, and may utilize various algorithms that may remove noise or false positive seatbelt part candidates. The system may utilize high order curve based seatbelt shape modeling functionalities that may localize a seatbelt even with occlusion or other obstructions. The system may localize a seatbelt corresponding to a subject and may be applicable to subjects of any suitable physical appearance, including physical appearances of different sizes, shapes, and attributes such as clothing types and hair types, and/or other various physical appearance attributes.

With reference to FIG. 1, FIG. 1 is an example of a system for seatbelt localization, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether.

Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

FIG. 1 illustrates an example 100 of a system for seatbelt localization, in accordance with at least one embodiment. In various embodiments, localization of a seatbelt refers to one or more processes that identify a location, size, shape, orientation, and/or other characteristics of one or more seatbelts depicted in one or more images (e.g., an image of a human in a driver or passenger seat of a vehicle). It should be noted that, while the example 100 depicts localization of a seatbelt, any suitable restraint device part of any suitable system may be localized. Restraint devices may include devices such as a seatbelt (e.g., a two point seatbelt, three point seatbelt, four point seatbelt, and so on), a safety harness, or other vehicle safety device.

A system for seatbelt localization, which may be referred to as a seatbelt localizer, may comprise a local predictor 104, a global assembler 108, and a shape modeler 116. Various processes of a system for seatbelt localization may be performed by one or more graphics processing units (GPU), such as parallel processing units (PPU). One or more processes of a system for seatbelt localization may be performed by any suitable processing system or unit (e.g., GPU, PPU, central processing unit (CPU)), and in any suitable manner, including sequential, parallel, and/or variations thereof. A local predictor 104, a global assembler 108, and a shape modeler 116 may be software modules of one or more computer systems onboard a vehicle. In some examples, a local predictor 104, a global assembler 108, and a shape modeler 116 are software programs executing on computer servers accessible via one or more networks, in which an input image 102 is provided to the computer servers from one or more computing systems of a vehicle via the one or more networks, and results of seatbelt localization of one or more seatbelts of the input image 102 are provided to back to the vehicle via the one or more networks. An input to a system for seatbelt localization may include an input image 102. In an embodiment, an input image 102 is an image of an entity in a vehicle with a restraint device, such as a seatbelt. Referring to FIG. 1, an input image 102 may be an image of a human wearing a seatbelt seated in a driver seat of a vehicle. A system for seatbelt localization may determine a location and an orientation of a seatbelt of an input image 102 and may further determine if the seatbelt of the input image 102 is applied correctly.

An input image 102 may be an image captured from one or more image capturing devices, such as a camera or other device. An input image 102 may be a frame of a video captured from one or more cameras. An input image 102 may be captured from one or more cameras placed in an interior of a vehicle. In some embodiments, an input image 102 is captured from one or more cameras that are external to a vehicle, such as through a monitoring system, mobile phone, drones, hand held imaging device, or other imaging system that is separate from the vehicle, and may capture images of the vehicle and occupants of the vehicle. In some examples, the input image is data captured from an image capture device that is further processed by adjusting one or more color properties, upsampling or downsampling, cropping, and/or otherwise processing the data. A vehicle may be a vehicle such as an autonomous vehicle, semi-autonomous vehicle, manual vehicle, and/or variations thereof. In some examples, a vehicle is an amusement ride vehicle (e.g., roller coaster), a construction vehicle, or other vehicle that requires one or more restraint devices. An input image 102 may be captured from one or more cameras such as those described in connection with FIG. 13A-13D. An input image 102 may be captured from a camera in a vehicle that is facing occupants of the vehicle. An input image 102 may be a color image, grayscale image, black/white image, or the like. An input image 102 may be captured from one or more cameras with different FOVs. An input image 102 may be an image with minimal color contrast, which may result in a low contrast of a seatbelt and background of the input image 102. An input image 102 may depict a seatbelt that may be occluded by one or more entities, such as hands, arms, apparel, or other objects. An input image 102 may depict a seatbelt that may be moving or stretched away to various positions. An input image 102 may depict a seatbelt that may be positioned as a straight line, or other irregular forms such as curves. An input image 102 may be distorted as a result of object or vehicle movement. An input image 102 may depict a subject, such as a vehicle driver or passenger, and a restraint device, such as a seatbelt, applied to the subject. In some examples, an input image 102 depicts a subject and a restraint device in an environment, such as a construction environment (e.g., the input image 102 depicts a subject in a construction environment with a restraint device such as a safety harness).

An input image 102 may be received or otherwise obtained by a local predictor 104. In some examples, an input image 102 is processed by one or more pre-processing operations to condition the input image 102 for processing; pre-processing operations may include operations such as feature/contrast enhancement, denoising, morphological operations, resizing/rescaling, and/or variations thereof. A local predictor 104 may be a collection of one or more hardware and/or software computing resources with executable instructions that, when executed, scans an input image and predicts areas of the input image that are part of a seatbelt. An input image 102 may comprise a collection of pixels, in which a seatbelt depicted in the input image 102 may occupy more than one pixel. For any given pixel, a local predictor 104 may predict whether the pixel belongs to a seatbelt or is a background pixel, using the pixel and information from its neighborhood pixels. Pixels determined to be part of a seatbelt may be identified as part of a foreground of an input image 102, and pixels determined to be not part of a seatbelt may be identified as part of a background of an input image 102. A local predictor 104 may perform an initial classification of areas of an input image 102 to determine areas of the input image 102 that depict or otherwise represent a restraint device (e.g., seatbelt). An area may comprise a pixel, collection of pixels, and the like. An area may comprise a grouping of pixels that may be in close proximity with each other. An area may comprise a continuous group or region of pixels of an image.

A local predictor 104 may generate either a true result, which may be indicated by a value 1, or a false result, which may be indicated by a value 0, representing seatbelt or non-seatbelt, respectively. In various embodiments, an input image 102 comprises noise and classification results may or may not be initially correct. In an embodiment, there are four possible cases, although there may be additional cases as well: (1) true positive, in which a pixel is part of a seatbelt and a local predictor 104 returns 1, (2) false positive, in which a pixel is not part of a seatbelt and a local predictor returns 1, (3) false negative, in which a pixel is part of a seatbelt and a local predictor 104 returns 0, and (4) true negative, in which a pixel is not part of a seatbelt, and a local predictor 104 returns 0. A local predictor 104 may prioritize high recall over high precision (e.g., a local predictor 104 may reduce false negatives, despite potential of increasing false positives).

A local predictor 104 may utilize nearby pixel neighbors for additional information. A pixel of an input image 102 located at a y-th row and x-th column of the input image 102 may be denoted as p(x,y), or any variation thereof. Dimensions of an input image 102 may be denoted as W width, H height, and K channels (e.g., K=3 (or 4) for color images, and K=1 for gray images). The p(x,y) and its neighbor pixels may constitute a set S and may be denoted by the following equation, although any variation thereof may be utilized:

$$S=\{p_{ij}|f_{dist}(p_{ij},p)\leq \varepsilon, 0<i\leq W, 0<j\leq H\} \quad (1),$$

where $f_{dist}$ may be a pixel distance function (e.g., $L_1$ distance), and E may be the threshold determining the boundary of the neighborhood.

In some examples, candidates of a neighborhood shape, also referred to as a patch, include a circle, rectangle, square, and/or variations thereof. In an embodiment, a local predictor 104 utilizes a square with a candidate pixel located at its center as the neighborhood shape. A length of the square may be denoted by L=2k+1, where k=1, 2, 3 . . . , in which the set S can be simplified through the following equation, although any variation thereof may be utilized:

$$S=\{p_{ij}|0\leq |i-y|\leq k, 0\leq |j-x|\leq k\} \quad (2).$$

A local predictor 104 may conduct isotropic checking along various directions. A local predictor 104 may output a binary prediction result vector $\vec{r}(x,y)$, which may be denoted by the following equation, although any variation thereof may be utilized:

$$\vec{r}(x,y)=(r_{\theta_0}, r_{\theta_1}, \ldots r_{\theta_{D-1}})^T \quad (3),$$

in which D may be the total number of directions for predicting, $\theta_0, \theta_1, \ldots \theta_{D-1}$ may be evenly spaced angles within range of $[0, \pi)$, and $r_{\theta_i}$ may be defined by the following equation, although any variation thereof may be utilized:

$$r_{\theta_i} = \begin{cases} 1, & \text{if } f_{criteria}(x, y, \theta_i) \geq T_{threshold} \\ 0, & \text{else if } f_{criteria}(x, y, \theta_i) < T_{threshold} \end{cases} \quad (4)$$

$$i = 0, 1, \ldots, D-1.$$

Figure 2:
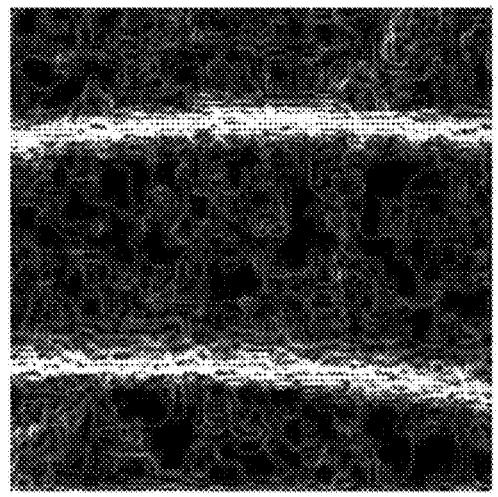
FIG. 2 illustrates examples of seatbelt patches for one or more pixels with one or more pixel neighbors in one or more targeted directions, in accordance with some embodiments of the present disclosure.
Figure 2:
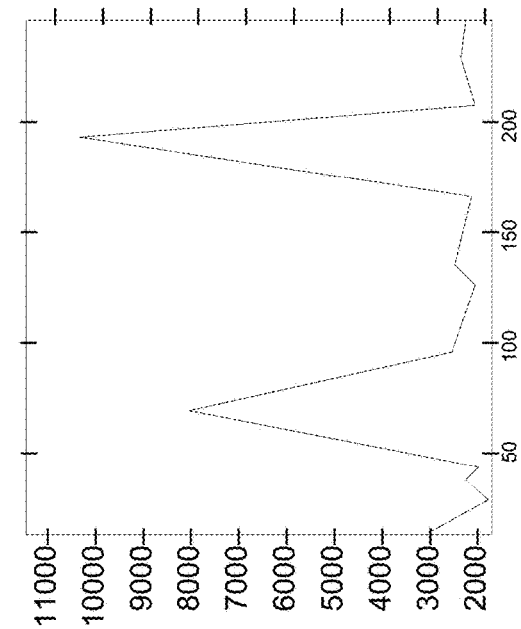
Figure 2:
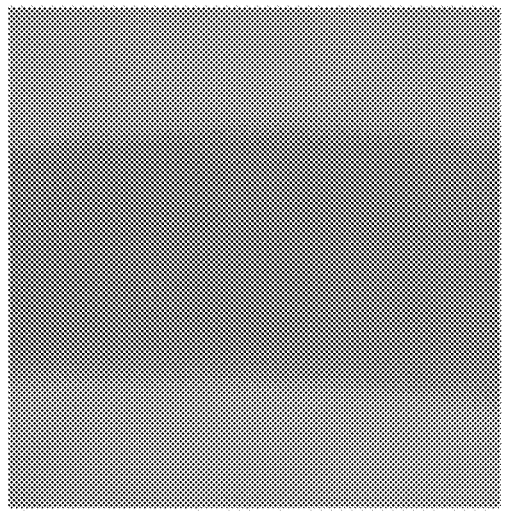
Figure 2:
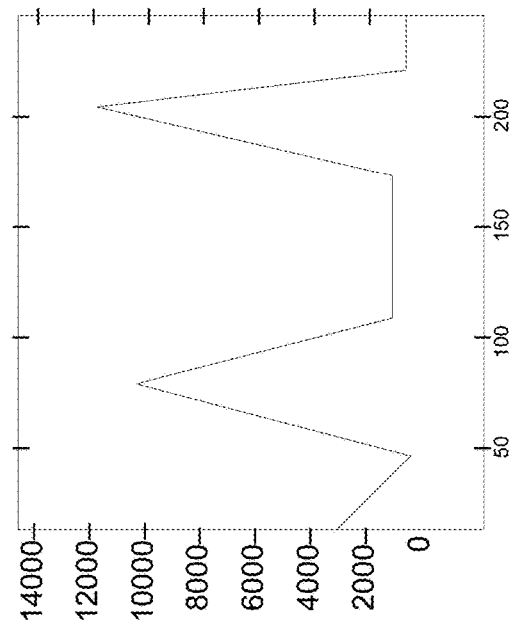
Figure 3:
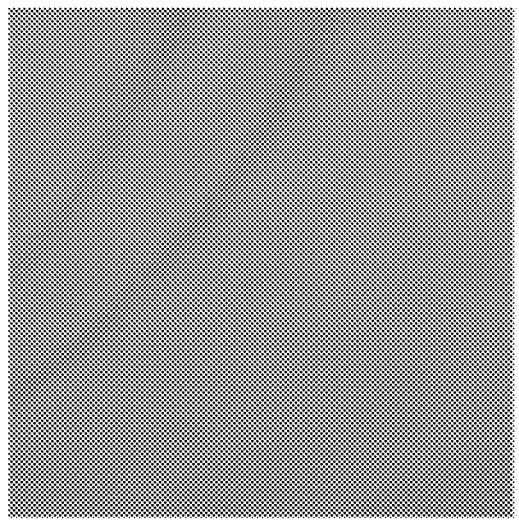
FIG. 3 illustrates examples of non-seatbelt patches for one or more pixels with one or more pixel neighbors in one or more targeted directions, in accordance with some embodiments of the present disclosure.
Figure 3:
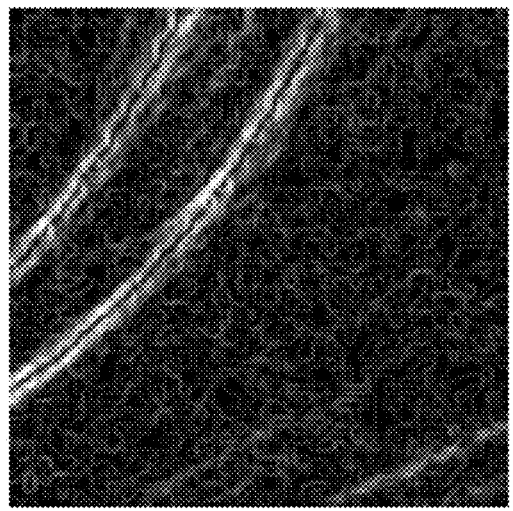
Figure 3:
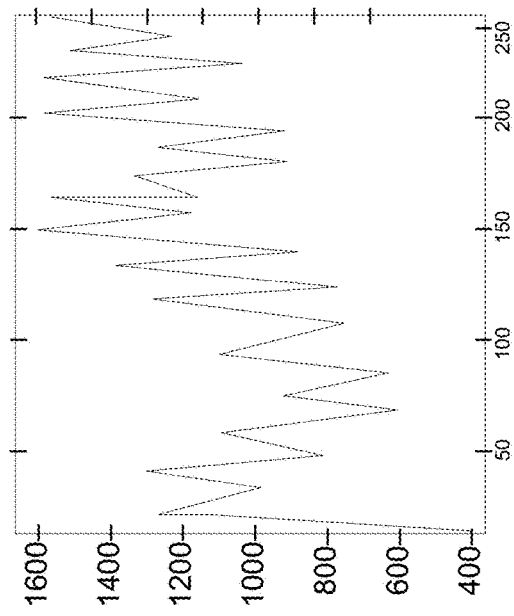
Figure 3:
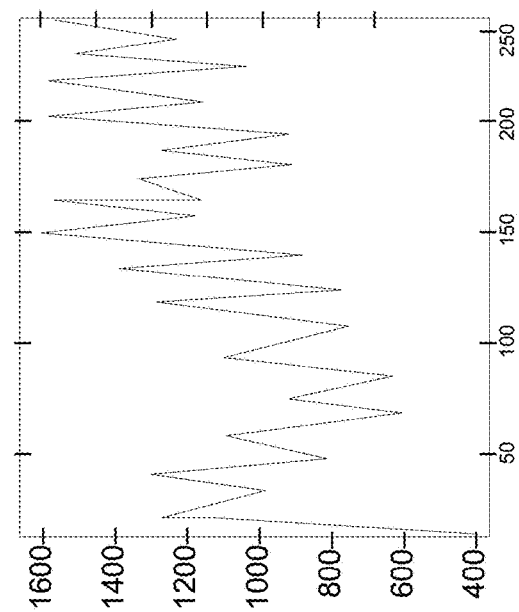

A criteria function, which may be denoted by $f_{criteria}(x, y, \theta_i)$, may determine for any pixel p(x,y) within an input image 102 and a specified direction $\theta_i$, whether a patch image generated using p and its neighborhood S at this direction is a seatbelt component or not. A local predictor, which may be denoted by $f_{predictor}(x,y)$, may be defined as a scale function of $\vec{r}(x,y)$, and may be denoted by the following equation, although any variation thereof may be utilized:

$$f_{predictor}(x,y)=\Sigma_{i=0}^{D-1} w_{\theta_i} * r_{\theta_i} \quad (5),$$

in which $w_{\theta_i}$ (i=0, 1, . . . , D−1) may be weights assigned to different directions. The weights can be determined from statistical analysis of a distribution of a seatbelt shape when worn by one or more entities. FIG. 2 and FIG. 3 illustrate examples of seatbelt and non-seatbelt patches for one or more pixels with one or more pixel neighbors in one or more targeted directions (e.g., patch directions), in accordance with at least one embodiment.

Referring to FIG. 2, an example 200 may include (a) a seatbelt patch sample, depicted in the top left, (b) an augmented seatbelt patch, depicted in the top right, (c) a seatbelt patch projected curve, depicted in the bottom left, and (d) a smoothed seatbelt curve, depicted in the bottom right. Referring to FIG. 2, (c) a seatbelt patch projected curve may correspond to (b) an augmented seatbelt patch, in which the x-axis of (c) may correspond to x or horizontal values of (b) and the y-axis of (c) may correspond to values of pixel intensity of vertical pixel columns of (b). Pixel intensity for a particular pixel column may be a sum of all pixel intensities, also referred to as pixel intensity levels, of pixels of the pixel column. A pixel intensity or pixel intensity level for a particular pixel may correspond to a brightness of a pixel (e.g., a pixel with high intensity may appear white-toned and a pixel with low intensity may appear black-toned). Referring to FIG. 2, (d) a smoothed seatbelt curve may be a smoothed version of (c) a seatbelt patch projected curve. For example, referring to FIG. 2, the two peaks of (c) a seatbelt patch projected curve and (d) a smoothed seatbelt curve correspond to the white vertical lines, which may correspond to boundaries of a seatbelt, of (b) an augmented seatbelt patch.

Referring to FIG. 3, an example 300 may include (e) a non-seatbelt patch sample, depicted in the top left, (f) an augmented non-seatbelt patch, depicted in the top right, (g) a non-seatbelt patch projected curve, depicted in the bottom left, and (h) a smoothed non-seatbelt curve, depicted in the bottom right. Referring to FIG. 3, (g) a non-seatbelt patch projected curve may correspond to (f) an augmented non-seatbelt patch, in which the x-axis of (g) may correspond to x or horizontal values of (f) and the y-axis of (g) may correspond to values of pixel intensity of vertical pixel columns of (f). Pixel intensity for a particular pixel column may be a sum of all pixel intensities of pixels of the pixel column. Referring to FIG. 3, (h) a smoothed non-seatbelt curve may be a smoothed version of (f) an augmented non-seatbelt patch.

It should be noted that FIG. 2 and FIG. 3 depict examples of potential seatbelt and non-seatbelt patches/curves and seatbelt and/or non-seatbelt patches/curves may be any variation thereof. A seatbelt patch sample may correspond to any patch or region of an image (e.g., an input image 102) that may depict one or more seatbelts, and a corresponding seatbelt patch curve may have any suitable shape based at least in part on the seatbelt patch sample.

Various information may be determined from FIG. 2 and FIG. 3. In an instance, structured edges are observed as seatbelt edges may generate two approximately parallel lines in the patch direction based on a scale of a patch (e.g., if the patch is small enough), in which, based on a camera-seatbelt relative geometric relationship, the structured edge can be parameterized in terms of inter-edge distance range, and variations thereof.

Intensity and/or saturation range may also be observed as seatbelts may be of various colors, such as black, grey, tan, and the like, in which, while pixel values may change along with various environmental changes (e.g., illumination), seatbelt pixel values may have some intensity range (e.g., seatbelt pixels are rarely pure white).

In an embodiment, the surface smoothness is also observed as seatbelts may have similar textures along belts, in which pixels within various seatbelt regions may have limited variety in terms of smoothness.

In an embodiment, $f_{structure}$, $f_{intensity}$, and $f_{smoothness}$ are denoted as binary functions in which:

$$f_{criteria}(x,y,\theta_i) = f_{structure}(x,y,\theta_i) \cap f_{intensity}(x,y,\theta_i) \cap f_{smoothness}(x,y,\theta_i) \quad (6).$$

Structure criteria $f_{structure}$ may be characterized in connection with a task, which may be defined as how to represent parallel edges for seatbelt boundaries within a pixel's neighborhood. A local predictor 104 may identify and localize candidate seatbelt edges, and use the candidate seatbelt edges to distinguish seatbelt pixels from non-seatbelt pixels (e.g., noise).

Seatbelt patches may have one or more directions, and for each patch, a local predictor 104 may determine whether there are seatbelt boundaries along a patch direction. A patch direction may be evenly spaced into D categories within a range $[0, \pi)$ (e.g., as depicted in equation (3)), in which, regardless of how a seatbelt is oriented, its orientation may be classified into one of the categories. For a given patch direction $\theta_i$, a local predictor 104 may check whether there are seatbelt edges parallel with the $\theta_i$. A local predictor 104 may determine a seatbelt patch in any suitable direction, and boundaries of a seatbelt along the seatbelt's direction.

Figure 4:
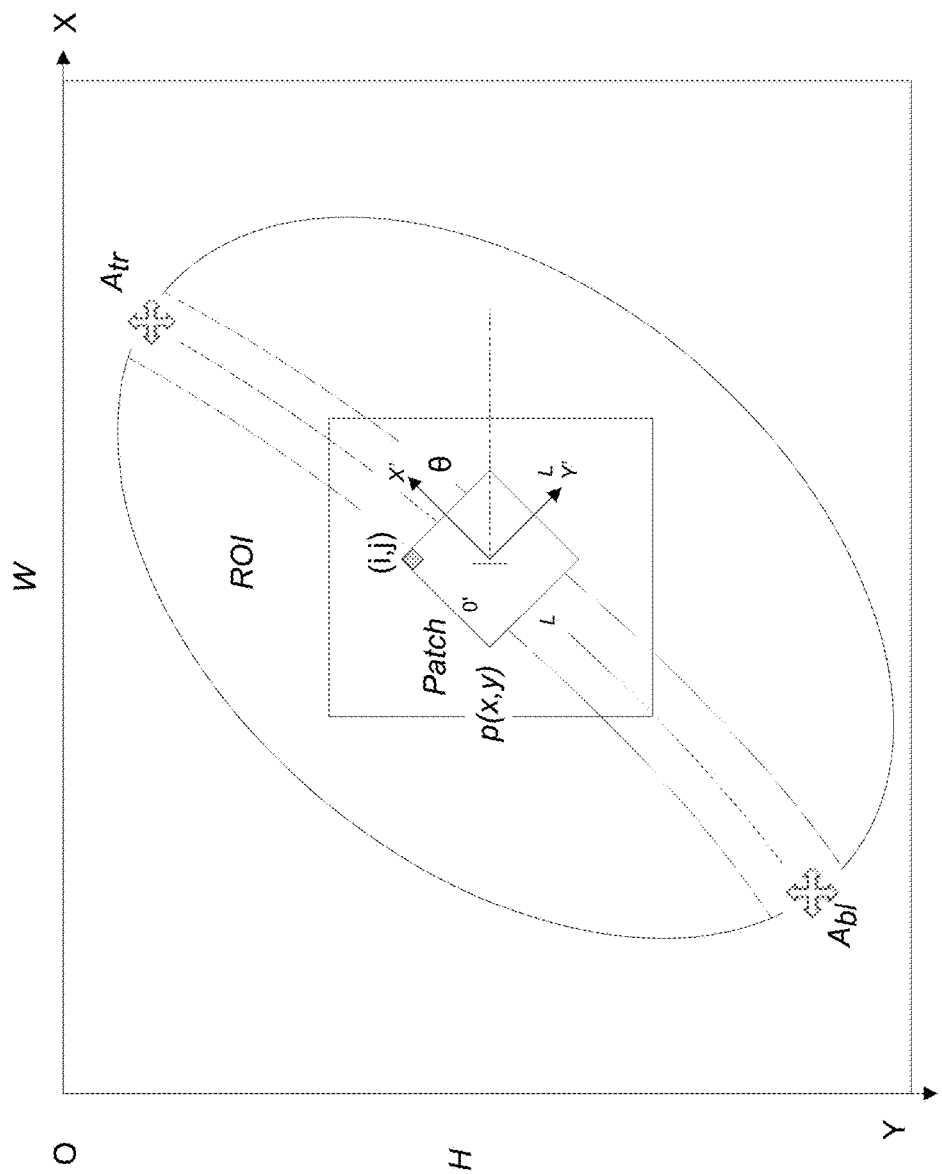
FIG. 4 illustrates an example of seatbelt patch geometry, in accordance with some embodiments of the present disclosure.

FIG. 4 illustrates an example 400 of seatbelt patch geometry, according to at least one embodiment. Seatbelt patch geometry may refer to one or more geometries or geometric characteristics of a particular seatbelt patch, such as patch direction, angles, orientation, size, boundaries, and the like. It should be noted that FIG. 4 depicts an example of potential seatbelt patch geometry, and seatbelt patch geometry may be any variation thereof. A seatbelt patch may correspond to any patch or region of an image (e.g., an input image 102) that may depict one or more seatbelts, and a corresponding seatbelt patch geometry may have any suitable geometry based at least in part on a shape or geometry of the seatbelt patch. Referring to FIG. 4, for each pixel (i,j) in a patch generated around pixel p(x,y), a value from pixel (x',y') may be retrieved from an image (e.g., input image 102) using the following equation, although any variation thereof may be utilized:

$$\begin{bmatrix} x' \\ y' \end{bmatrix} = \begin{bmatrix} \cos\theta & -\sin\theta \\ \sin\theta & \cos\theta \end{bmatrix} \left( \begin{bmatrix} j \\ i \end{bmatrix} - \begin{bmatrix} \frac{1}{2}L \\ \frac{1}{2}L \end{bmatrix} \right) + \begin{bmatrix} x \\ y \end{bmatrix}, \quad (7)$$

in which i=1, 2, ..., L and j=1, 2, ..., L.

A local predictor 104 may retrieve seatbelt patches and/or non-seatbelt patches using one or more equations, such as equation (7) as described above. A local predictor 104 may determine whether a patch has a structured edge pair or not. Edges in patches may be one or more series of aligned pixel rows with sudden pixel intensity changes at the same location within each row. The change can be a pixel intensity increment or decrement. The index of the sudden changes may be a position where a line may be located. In some examples, in a case of two parallel lines, a patch has structured edges.

A local predictor 104 may utilize a 2-dimensional (2D) gradient operation to capture magnitudes of sudden intensity changes, and accumulate along patch directions to distinguish seatbelt edges from background noise. $f_{patch}(x,y,\theta,j)$ may be defined as a resulting curve after a projection, and may be denoted by the following equation, although any variation thereof may be utilized:

$$f_{patch}(x, y, \theta, j) = \sum_{i=1}^{L} \sqrt{\frac{\partial f(x, y, \theta, i, j)^2}{\partial j} + \frac{\partial f(x, y, \theta, i, j)^2}{\partial i}}, \quad (8)$$

in which j may be the variable indexing patch columns, i may be the row index, $f(x,y,\theta,i,j)$ may be a patch intensity function. FIG. 2 at (c) and FIG. 3 at (g) may depict examples of curves.

Curves may be affected by various perturbances, such as illumination changes, as well as other noise. A local predictor 104 may apply an algorithm such as a Savtzsky-Golay algorithm to smooth curves for further processing. $f'_{patch}(x,y,\theta,j)$ may be defined as a filtered curve, and may be denoted by the following equation, although any variation thereof may be utilized:

$$f'_{patch}(x, y, \theta, j) = \sum_{k=\frac{1-t}{2}}^{\frac{t-1}{2}} C_k * f_{patch}(x, y, \theta, j+k), \quad (9)$$

$$\frac{t-1}{2} \leq j \leq L - \frac{t-1}{2},$$

in which t may be a convolution coefficients number, and $C_k$ may be the respective coefficients. FIG. 2 at (d) and FIG. 3 at (h) may depict examples of filtered curves.

Figure 5:
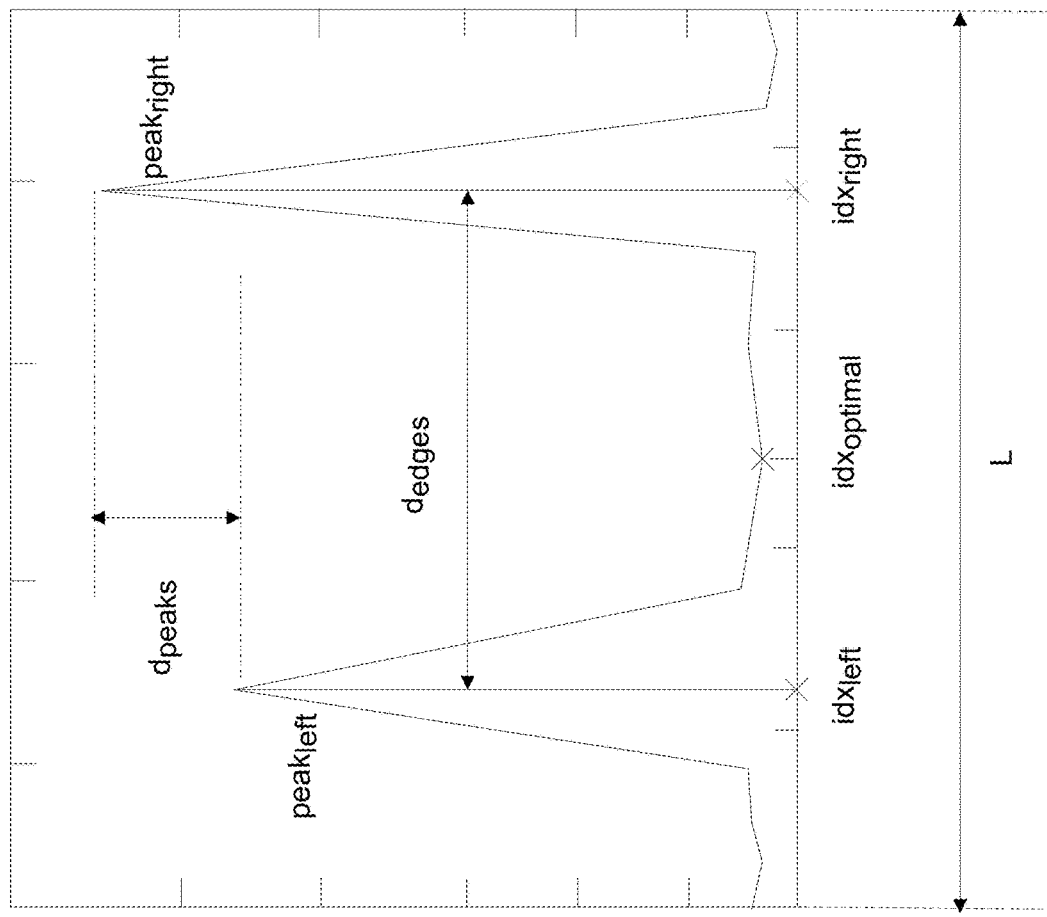
FIG. 5 illustrates an example of localization of structured edges, in accordance with some embodiments of the present disclosure.

The seatbelt patches with structured edges may have filtered curve patterns similar to those depicted in FIG. 5, while non-seatbelt patches may have random curves. A local predictor 104 may extract various properties from curves to recognize seatbelt patterns, such as an inter-edge distance $d_{edges}$ and a peak value difference $d_{peaks}$. In an embodiment, $f_{structure}(x,y,\theta_t)$ is defined by the following equation, although any variation thereof may be utilized:

$$f_{structure} = \begin{cases} 1, & \text{if } \tau_{min} \leq d_{edges} \leq \tau_{max} \cap \rho_{min} \leq \\ & \frac{d_{peaks}}{\max(peak_{left}, peak_{right})} \leq \rho_{max} \\ 0, & \text{otherwise} \end{cases} \quad (10)$$

A local predictor 104 may identify two peak values (e.g., $peak_{left}$ and $peak_{right}$), and their respective indexes (e.g., $idx_{left}$ and $idx_{right}$) for any given curve to determine $d_{edges}$ and $d_{peaks}$.

FIG. 5 illustrates an example 500 of localization of structured edges, in accordance with at least one embodiment. The example 500 depicts a determination of edges of a seatbelt from a seatbelt patch curve, such as those depicted in FIG. 2 and FIG. 3. It should be noted that FIG. 5 depicts an example of a potential localization of structured edges from a seatbelt patch curve, and localization of structured edges from a seatbelt patch curve may be any variation thereof. A seatbelt patch curve may correspond to any suitable patch or region of an image (e.g., an input image 102) that may depict one or more seatbelts, and a corresponding localization of structured edges from the seatbelt patch curve may indicate any suitable edges or characteristics based at least in part on the seatbelt patch curve.

Referring to FIG. 5, a local predictor 104 may or may not select the two largest points within a particular curve, as the selection may be inaccurate because both points may be located near the tallest peak. Referring to FIG. 5, if a curve is cut into two parts, two peaks may be separated, and both peaks may be retrieved by a local predictor 104 by traversing each point to find the maximum point. A one-dimensional two-class classification task may be utilized via finding an optimal cutting position, denoted by $idx_{optimal}$. Inter-class distance may be maximized in connection with $idx_{optimal}$, which may be defined by the following equation, although any variation thereof may be utilized:

$$idx_{optimal} = \arg\max_{1 \leq idx \leq L} (w_{left} * (\mu_{left} - \mu_L)^2 + w_{right} * (\mu_{right} - \mu_L)^2), \quad (11)$$

in which, in an embodiment, $w_{left}=\sum_{j=1}^{idx}f_{patch}(x,y,\theta,j)$, $w_{right}=\sum_{j=idx+1}^{L}f_{patch}(x,y,\theta,j)$, $\mu_{left}=\sum_{j=1}^{idx}j*f_{patch}(x,y,\theta,j)$, $\mu_{right}=\sum_{j=idx+1}^{L}j*f_{patch}(x,y,\theta,j)$, and $\mu_L=\sum_{j=1}^{L}j*f_{patch}(x,y,\theta,j)$.

A local predictor 104 may solve a non-linear optimization task by at least determining $idx_{optimal}$. A local predictor 104 may calculate $idx_{left}$ and $idx_{right}$ by searching for the maximum elements position in $[1, idx_{optimal}]$ and $(idx_{optimal}, L]$. Their respective function values may be $peak_{left}$ and $peak_{right}$.

Seatbelt pixel intensity may vary and change in response to various environmental illuminations. Environmental illuminations may comprise various light sources such as interior lights of a vehicle. A local predictor 104 may learn intensity distribution of pixels. $\delta_{min}$ and $\delta_{max}$ may be set as a lower and upper bound for a seatbelt localization instance. A weighted intensity for $f_{patch}(x,y,\theta)$ may be denoted as $d_{intensity}$, and may be calculated through a following equation, although any variation thereof may be utilized:

$$d_{intensity}=\sum_{i=1}^{L}\sum_{j=1}^{L}w_{ij}*f_{patch}(x,y,\theta,i,j) \quad (12)$$

in which $$w_{ij} = \frac{1}{2\pi\sigma}e^{-\frac{(\frac{L}{2}-i)^2+(\frac{L}{2}-j)^2}{2\sigma^2}}$$

may be Gaussian distributed weights assigned to each pixel in the seatbelt patch.

In an embodiment, $f_{intensity}$ is defined by the following equation, although any variation thereof may be utilized:

$$f_{intensity} = \begin{cases} 1, & \text{if } \delta_{min} \leq d_{intensity} \leq \delta_{max} \\ 0, & \text{otherwise} \end{cases} \quad (13)$$

In various embodiments, a seatbelt surface is smooth with minimal intensity changes. Intensity variance may be utilized within an interested region ω as a criterion for evaluating smoothness. In an embodiment, $d_{smoothness}$ is defined by the following equation, although any variation thereof may be utilized:

$$d_{smoothness}=\sum_{i=x-\omega}^{x+\omega}\sum_{j=y-\omega}^{y+\omega}(f_{patch}(i,j)-f_{patch}(x,y))^2 \quad (14).$$

In an embodiment, $f_{smoothness}$ is defined by the following equation, although any variation thereof may be utilized:

$$f_{smoothness} = \begin{cases} 1, & \text{if } \varphi_{min} \leq d_{smoothness} \leq \varphi_{max} \\ 0, & \text{otherwise} \end{cases} \quad (15)$$

A local predictor 104 may output pixel candidates 106, which may comprise one or more indications of one or more pixels of an input image 102 that may potentially correspond to a seatbelt depicted in the input image 102. Pixel candidates 106 may be input to a global assembler 108, which may remove inaccurate candidates from pixel candidates 106 and selectively assemble the qualified seatbelt pixel candidates.

A global assembler 108 may be a collection of one or more hardware and/or software computing resources with executable instructions that, when executed, assembles positive seatbelt part candidates by removing false positives based on seatbelt attributes such as shape and location. A global assembler 108 may apply a set of constraints to pixel candidates 106 to refine pixel candidates 106 to obtain qualified pixel candidates 114. A set of constraints may include characteristics such as parameters of a camera that captured an input image 102 (e.g., camera lens dimensions, focal point, principal point, distortion parameters), standard seatbelt dimension ranges (e.g., width and/or length ranges), standard seatbelt characteristics and/or parameters (e.g., standard seatbelt colors, material), vehicle parameters (e.g., vehicle layout, vehicle components), and the like. A global assembler 108 may apply a set of constraints to pixel candidates 106 such that pixel candidates of pixel candidates 106 that do not adhere to or otherwise conform to the set of constraints may be removed to determine qualified pixel candidates 114 (e.g., pixel candidates that indicate a seatbelt with a width that is significantly longer than a standard seatbelt width range may be removed).

A global assembler 108 may comprise an automatic location mask generation 110 and a width range estimation 112. An automatic location mask generation 110 may be a collection of one or more hardware and/or software computing resources with executable instructions that generates one or more image masks for an image such as an input image 102 indicating one or more seatbelts. A width range estimation 112 may be a collection of one or more hardware and/or software computing resources with executable instructions that, estimates a range of a width of a seatbelt depicted in an image, such as an input image 102.

In an embodiment, for a 3-point seatbelt, the seatbelt has three anchors, referred to as points: a top right anchor, denoted by $A_{tr}$, a bottom left anchor, denoted by $A_{bl}$, and a bottom right anchor, denoted by $A_{br}$. Belts that come from a top right anchor as well as a bottom right anchor may be inserted using a buckle into a bottom left anchor. Techniques described herein in connection with a top right anchor and a bottom right anchor may similarly apply to a bottom right anchor to a bottom left anchor, or any suitable restraint device anchors. In some embodiments, the seatbelt anchors are movable. That is, one or more seatbelt anchors of a 3-point seatbelt, for instance, can be adjusted, rotated, and/or titled in various directions. In some embodiments, the one or more seatbelt anchors are adjusted via a tilt to a specific angle. In some instances, a seatbelt anchor is connected to a mounting plate that is attached to a side door of a passenger vehicle. The seatbelt anchor may be moved (e.g., by sliding up, down, left, or right) relative to the mounting plate.

There may be constant forces inside anchors for tightening the belt using springs; the location distribution of seatbelt pixels observed via a fixed camera may be in a limited area. In some examples, a global assembler 108 comprises various machine learning algorithms that learn a location distribution of seatbelt pixels. In various embodiments, seatbelts generally do not appear on top of steering wheels or other in vehicle systems (e.g., entertainment systems, driver assist systems). In some examples, a range of a seatbelt width in image frames is estimated by a global assembler 108 for filtering seatbelt candidates. A global assembler 108 may process multiple seatbelts within a frame. In some embodiments, one or more processes of a global assembler 108 are performed in parallel using algorithm level parallelization. Algorithm level parallelization may refer to a process in which processes (e.g., processes or operations performed by a system for seatbelt localization) that can be performed in parallel are first identified and then performed in parallel. A global assembler 108 may perform various optimization techniques, such as image down-sampling, pixel step adjustment, angle sampling, and the like.

An automatic location mask generation 110 may generate a seatbelt location mask, which may be a visual indication of a location of a seatbelt within an image, such as an input image 102. An automatic location mask generation 110 may comprise one or more software programs that may analyze one or more aspects of a camera, such as a camera that captured an input image 102. An automatic location mask generation 110 may analyze various configurations of a camera to generate a seatbelt location mask, such as calibrations of the camera, camera pose, a type of camera lens, and the like. An automatic location mask generation 110 may comprise one or more components that may perform camera calibration, camera localization, and 3D reconstruction. Camera calibration may comprise one or more functions and/or processes that may calibrate a camera (e.g., infrared (IR) cameras, red-green-blue (RGB) cameras, color cameras, etc.) and process images from the camera by processing the camera's internal attributes, such as focal lens, principal point, or un-distortion parameters. Camera localization may comprise one or more functions and/or processes that may provide a camera's six degree of freedom (6DOF) location information in a predefined world coordinate system. 3D reconstruction may comprise one or more functions and/or processes that may determine any point's coordinate in 3D space via utilizing encoded tags. Camera localization may comprise processes that may determine a camera's 6DOF pose in regard to a vehicle coordinate system, and may retrieve seatbelt anchors' coordinates or positions within a camera coordinate system. Camera localization may utilize one or more models of a vehicle to determine seatbelt anchors' coordinates or positions. 3D reconstruction may comprise processes that may calculate a relative relationship between seatbelt anchors and camera coordinate system.

In an embodiment, a camera (e.g., a camera that captures an input image 102) is calibrated with intrinsic parameters K, and extrinsic parameters R and T. A seatbelt may have anchors denoted by $A_{tr}(X_{tr},Y_{tr},Z_{tr})$ and $A_{bl}(X_{bl},Y_{bl},Z_{bl})$. An automatic location mask generation 110 may obtain the anchors' correspondent coordinates, referred to as anchor positions, in the image coordinate system. In an embodiment, an anchor's image position is denoted by $A_i(x_i,y_i)$, i=tr, bl, in which, although any variation thereof of the following equation may be utilized:

$$\begin{bmatrix} x_i \\ y_i \\ 1 \end{bmatrix} = s * K * \begin{bmatrix} R & T \\ 0 & 1 \end{bmatrix} \begin{bmatrix} X_i \\ Y_i \\ Z_i \\ 1 \end{bmatrix}, \quad (16)$$

where s may be a scale factor, and i may correspond to tr, bl.

A majority of a location distribution of a seatbelt may fall into an ellipse using two anchors as ends of the long axis. In an embodiment, major axis distance is denoted by $d_{major}$, and may be defined through the following equation, although any variation thereof may be utilized:

$$d_{major} = \sqrt{(x_{tr}-x_{bl})^2+(y_{tr}-y_{bl})^2} \quad (17).$$

An automatic location mask generation 110 may obtain minor axis distance through one or more machine learning algorithms that may analyze various seatbelt fastening processes. In an embodiment, minor axis distance is denoted by $d_{minor}$, and set location mask is denoted by $S_{location}$, which is defined by the following equation, although any variation thereof may be utilized:

$$S_{location} = \left\{(x_{local}, y_{local}) \mid \frac{x_{local}^2}{\left(\frac{1}{2}+d_{major}\right)^2} + \frac{y_{local}^2}{\left(\frac{1}{2}+d_{minor}\right)^2} \leq 1\right\}. \quad (18)$$

The points may be defined in an ellipse local coordinate system, where the origin $O_{ellipse}$ may be at the middle point of segment $A_{bl}A_{tr}$ with image coordinate $$\left(\frac{x_{tr}+x_{bl}}{2}, \frac{y_{tr}+y_{bl}}{2}\right),$$

x-axis may point from $A_{bl}$ to $A_{tr}$, and y-axis may be obtained via clockwise rotation of x-axis for 90 degrees. A corresponding coordinate in an image coordinate may be denoted by $(x_{global}, y_{global})$, in which:

$$\begin{bmatrix} x_{global} \\ y_{global} \end{bmatrix} = \begin{bmatrix} \cos\theta_s & -\sin\theta_s \\ \sin\theta_s & \cos\theta_s \end{bmatrix} \begin{bmatrix} x_{local} \\ y_{local} \end{bmatrix} + \begin{bmatrix} \frac{x_{tr}+x_{bl}}{2} \\ \frac{y_{tr}+y_{bl}}{2} \end{bmatrix}, \quad (19)$$

where, $$\theta_s = a\cos\frac{x_{tr}-x_{bl}}{\sqrt{(x_{tr}-x_{bl})^2+(y_{tr}-y_{bl})^2}}.$$

An automatic location mask generation 110 may obtain a location mask $S_{location}$ in image coordinates. The seatbelt pixel candidates generated by a local predictor 104 outside of the mask may be omitted.

A width range estimation 112 may estimate a range of a width, also referred to as a width size, of a seatbelt of an image (e.g., input image 102). Seatbelt standard widths may range from 46-49 mm (e.g., 2 inches), in which most belts may generally be approximately 47 mm, or any suitable value of any suitable range. The width of a seatbelt of an image may depend on a pose of the seatbelt. If the belt is parallel with a camera imaging sensor or extended towards the camera, the seatbelt width may increase. If the belt surface is perpendicular with the image sensor or is further away from the camera, the seatbelt width may decrease. A lower bound of seatbelt width $\tau_{min}$ may be set based at least in part on one or more sensitivity requirements. In an embodiment, $\tau_{min}$ is set to half of $\tau_{max}$ to avoid involving noise patterns.

In an embodiment, a seatbelt point in the middle of two anchors is denoted by $P_s(X_s, Y_s, Z_s)$, and a seatbelt standard width is denoted by $d_{std}$, in which a possible correspondent point set for another edge, denoted by $S_{pair}$, is defined by the following equation, although any variation thereof may be utilized:

$$S_{pair} = \{(X'_s, Y'_s, Z'_s) \mid \sqrt{(X'_s-X_s)^2+(Y'_s-Y_s)^2+(Z'_s-Z_s)^2} \leq d_{std}\} \quad (20).$$

A regular passenger arm distance may be denoted by $d_{arm}$, in which a maximum width $\tau_{max}$ may occur when the passenger grasps a belt and pushes the belt towards a camera. In an embodiment, a new seatbelt point coordinate set is denoted by $S_{new}$ and is defined by the following equation, although any variation thereof may be utilized:

$$S_{new} = \{(X'_{new}, Y'_{new}, Z'_{new}) \mid \sqrt{(X'_{new}-X_s)^2+(Y'_{new}-Y_s)^2+(Z'_{new}-Z_s)^2} \leq d_{arm}\} \quad (21).$$

A width range estimation 112 may extract an envelope of positions of a new point, and estimate the width upper bound $\tau_{max}$. The seatbelt width may be utilized to determine a structured edge threshold, and may be utilized to determine a patch size L, which may be required to be larger than $\tau_{max}$. A global assembler 108 may determine locations of multiple seatbelts within a single image. A global assembler 108 may generate location masks for each seatbelt region.

A global assembler 108 may utilize one or more graphics processing units (GPU) to process an image (e.g., input image 102). A global assembler 108 may use multiple threads of one or more GPUs to process multiple patches concurrently. A global assembler 108 may utilize work streams of one or more GPUs to process seatbelt regions in parallel. A global assembler 108 may process one or more areas of an image in parallel or concurrently using one or more threads of one or more GPUs. A global assembler 108 may assign processing of multiple frames to different computation units of one or more GPUs to achieve frame level acceleration. A global assembler 108 may down-sample input images to reduce usage of computing resources in processing the input images. A global assembler 108 may process an image (e.g., input image 102) in multiple directions otherwise or in addition to a pixel by pixel traversal of the image. A global assembler 108 may adjust a discretization of patch direction angles to reduce usage of computing resources. A global assembler 108 may assemble or otherwise determine qualified pixel candidates 114, which may comprise pixels of an input image 102 that correspond to one or more seatbelts depicted in the input image 102.

Qualified pixel candidates 114 may comprise sets of pixel candidates of seatbelts for each seatbelt region of interest. Qualified pixel candidates 114 may also be referred to as candidate pixels, pixel candidates, candidates, and/or variations thereof. A shape modeler 116 may be a collection of one or more hardware and/or software computing resources with executable instructions that, when executed, builds a geometric seatbelt shape model based on outputs (e.g., qualified pixel candidates 114) from a global assembler 108, and maps the model onto an input image. A shape modeler 116 may remove noise candidates from qualified pixel candidates 114 and model a seatbelt shape.

In an embodiment, a set of candidates from a local predictor 104 is denoted by $S_{predictor}$ and a location mask is denoted by $S_{location}$, in which candidates for shape modeling $S_{modeling}$ from within $S_{predictor}$ is defined by the following equation, although any variation thereof may be utilized:

$$S_{modeling} = \{(x,y) \mid (x,y) \in S_{location} \&\& f_{predictor}(x,y) \geq \gamma_{pre}\} \quad (22),$$

in which $\gamma_{pre}$ may be a threshold for predicting response numbers, which may be proportional to a total number of patch directions.

A shape modeler 116 may model a shape of a seatbelt through a high order polynomial curve. A high order polynomial curve may refer to a polynomial curve with a degree higher than 2. A shape modeler 116 may model a shape of a seatbelt through a polynomial curve of any suitable order. An order of a polynomial curve may correspond to a complexity of a shape of seatbelt, with higher orders corresponding to a more complex shape (e.g., a shape with more curves, oscillations, and the like). In some examples, passengers can push a seatbelt away while driving, which causes, at various positions along an x-axis, multiple y values; this may result in a polynomial model not being applicable. In an embodiment, a shape modeler 116 transforms global image coordinates into an anchor local coordinate system through the following equation, although any variation thereof may be utilized:

$$\begin{bmatrix} x_{local} \\ y_{local} \end{bmatrix} = \begin{bmatrix} \cos\theta_s & \sin\theta_s \\ -\sin\theta_s & \cos\theta_s \end{bmatrix} \left( \begin{bmatrix} x_{global} \\ y_{global} \end{bmatrix} - \begin{bmatrix} \frac{x_{tr} + x_{bl}}{2} \\ \frac{y_{tr} + y_{bl}}{2} \end{bmatrix} \right). \quad (23)$$

Figure 6:
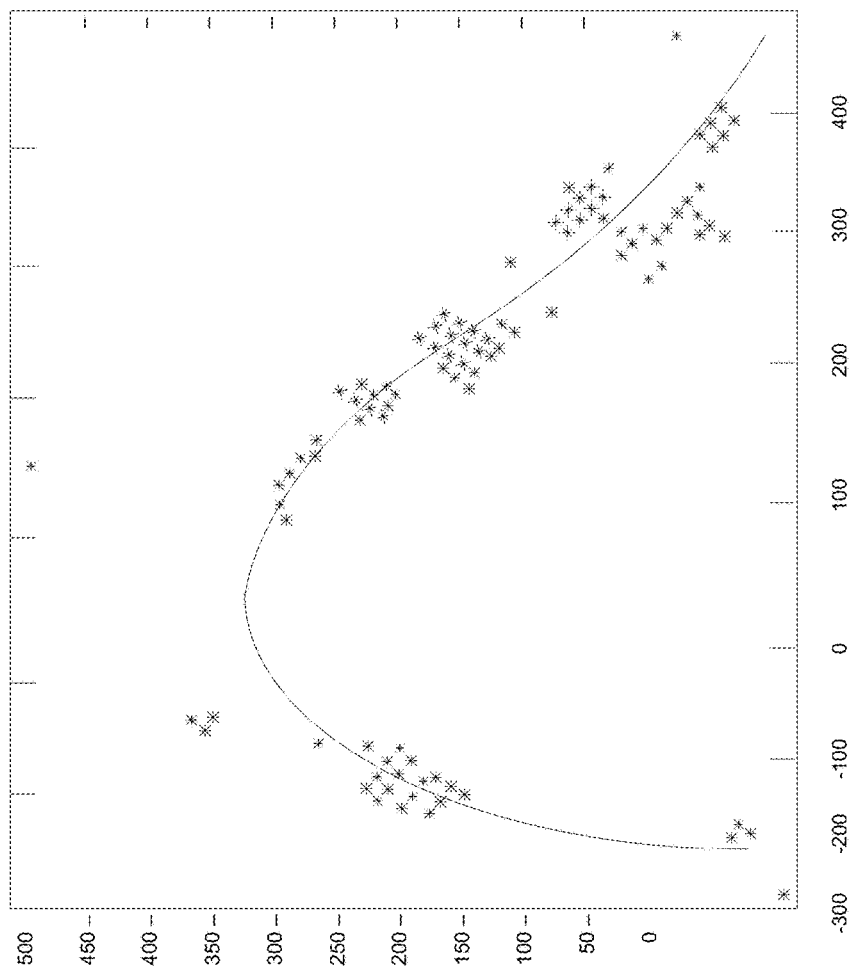
FIG. 6 illustrates an example of a candidate map, in accordance with some embodiments of the present disclosure.

FIG. 6 illustrates an example 600 of a candidate map, in accordance with at least one embodiment. The example 600 may depict a candidate map after a transformation from global image coordinates to an anchor local coordinate system. It should be noted that FIG. 6 depicts an example of potential candidates and a curve fit to the candidates, and candidates and fit curves may be any variation thereof. Potential candidates may correspond to any suitable pixels or region of pixels of an image (e.g., an input image 102) that may depict one or more seatbelts, and a corresponding curve fit to the potential candidates may indicate any suitable seatbelt shape.

The example 600 may depict candidate pixels of a seatbelt and a curve (e.g., a high order polynomial curve) fit to the candidate pixels that corresponds to a shape of the seatbelt. A high order polynomial regression for modeling a shape of a seatbelt may be utilized, as various users may stretch a seatbelt into various shapes. In an embodiment, observed points are denoted by $(x_i, y_i)$, in which $y_i$ corresponds to the following equation, although any variation thereof may be utilized:

$$y_i = \beta_0 + \beta_1 x_i^1 + \beta_2 x_i^2 + \ldots + \beta_N x_i^N \quad (24),$$

where $\beta_0, \beta_1, \beta_2 \ldots \beta_N$ may be coefficients and N may be a polynomial order. Coefficients of a polynomial curve may be determined such that the polynomial curve corresponds to or approximates a shape of a seatbelt.

A shape modeler 116 may utilize various algorithms to reduce noise, such as an M-estimator sample consensus (MSAC) algorithm. A shape modeler 116 may transform a curve into a global image plane for visualization. A shape modeler 116 may determine a model of a seatbelt shape from an image depicting a seatbelt (e.g., input image 102) that at least approximates a shape and/or position of the seatbelt. A shape modeler 116 may further determine if a seatbelt identified in an image (e.g., input image 102) is applied correctly. In some examples, a shape modeler 116 provides a model of a seatbelt to one or more neural networks that are trained to infer if the seatbelt is applied correctly based on the model. One or more neural networks may determine, based on a seatbelt model obtained from a shape modeler 116, if the seatbelt is applied correctly, and provide an indication of whether the seatbelt is applied correctly to the shape modeler 116. A shape modeler 116 may visualize a modeled seatbelt shape as well as if a seatbelt corresponding to the modeled seatbelt shape is applied correctly as a modeled input image 118. In an embodiment, a modeled input image 118 is an input image 102 with a model of a seatbelt shape visualized. A modeled input image 118 may depict an input image 102 with a location and a shape of a seatbelt of the input image 102 indicated through one or more visualizations, such as a visual border of the seatbelt and the like. A modeled input image 118 may further comprise one or more visualizations that may indicate if a seatbelt is worn and/or applied correctly.

For example, referring to FIG. 1, a modeled input image 118 comprises a visual border of a seatbelt and an indication, denoted by "Seatbelt: ON," that the seatbelt is worn and applied correctly. Indications that a seatbelt is worn and applied correctly may be denoted in various ways, such as "Seatbelt: ON," "Seatbelt: Applied," and the like. Indications that a seatbelt is worn but applied incorrectly may be denoted in various ways, such as "Seatbelt: OFF," "Seatbelt: Incorrect," and the like. Indications that a seatbelt is not worn may be denoted in various ways, such as "Seatbelt: OFF," "Seatbelt: Not Applied," and the like. A seatbelt that is applied correctly or is in a proper position may be a seatbelt that is in the locked position and is worn diagonally and across an occupant's chest. A seatbelt that is applied incorrectly or is an improper position may be a seatbelt that is not applied correctly or is in a proper position.

A system for seatbelt localization may provide one or more systems of a vehicle with a model of a seatbelt as well as an indication if the seatbelt is applied correctly. In some examples, a system for seatbelt localization is executing one or more computer servers, in which a model of a seatbelt and an indication if the seatbelt is applied correctly is provided to one or more systems of a vehicle through one or more communication networks. Systems of a vehicle may perform various actions as a result of obtaining a model of a seatbelt and an indication if the seatbelt is applied correctly. Systems of a vehicle may provide warning indications if a seatbelt is not worn or worn but applied incorrectly. Warning indications may be audio indications such as warning sounds, visual indications such as warning lights, physical indications such as warning vibrations, and the like. Systems of a vehicle may cause one or more propulsion systems of the vehicle to stop or cease propulsion of the vehicle if a seatbelt is not worn or worn but applied incorrectly. Systems of a vehicle may provide indications through one or more networks to various systems (e.g., safety monitoring systems) if a seatbelt is not worn or worn but applied incorrectly.

A system for seatbelt localization may be a passive system. The system may not require modifications to existing systems of a vehicle to detect seatbelts of occupants of the vehicle from one or more images of the seatbelts. The system may detect seatbelts passively, which may refer to detection that does not require input from one or more sensors of a vehicle or modification to one or more systems of the vehicle (e.g., the system may not require seatbelts of a vehicle to have identifying marks). A system for seatbelt localization may combine models determined from multiple images to determine a final seatbelt model. In some examples, a system for seatbelt localization localizes and models a set of seatbelts from a set of images depicting an occupant and a corresponding seatbelt, in which the system combines the models to determine a final seatbelt model for the corresponding seatbelt of the occupant. A system for seatbelt localization may combine or otherwise augment determined seatbelt models together to determine a final seatbelt model such that confidence in the final seatbelt model is increased. A system for seatbelt localization may combine seatbelt models together by evaluating similarities and differences between the seatbelt models to determine a final seatbelt model. A system for seatbelt localization may combine inferences made from one or more images to determine a final seatbelt model and increase confidence in the final seatbelt model.

In some examples, a system for seatbelt localization may be utilized in conjunction with one or more active seatbelt detection systems. An active seatbelt detection system may refer to one or more systems of a vehicle that are utilized to directly detect and localize seatbelts of the vehicle. Active seatbelt detection systems may include use of various sensors to detect and localize seatbelts, such as pressure sensors, weight sensors, motion sensors, or other sensors, and may require modifications to existing systems of a vehicle (e.g., an active seatbelt detection system may require seatbelts of a vehicle to have identifying marks). The system for seatbelt localization may localize a seatbelt, and utilize input from one or more active seatbelt detection systems to verify that the localized seatbelt has been determined correctly. Alternatively, the system may receive one or more models of a localized seatbelt from one or more active seatbelt detection systems, and localize the seatbelt through one or more images to verify that the one or more models of the localized seatbelt have been determined correctly. The system may receive or obtain input from one or more vehicle systems, such as active seatbelt detection systems, to localize a seatbelt. For example, a system for seatbelt localization obtains data from sensors of a vehicle, such as pressure sensor data, weight sensor data, motion sensor data, and the like, and utilizes the data in connection with techniques described above to localize and model a seatbelt from an image of the seatbelt in the vehicle. Sensor data may be utilized to determine constraints to filter pixel candidates (e.g., sensor data may provide information indicating a position or location of a seatbelt, which can be utilized to remove inaccurate candidates of pixel candidates that do not conform to the information provided by the sensor data).

A system for seatbelt localization may localize and model seatbelts through patch matching and patch refining processes, such as those described above and/or various algorithms such as a PatchMatch algorithm, mixed-resolution patch-matching (MRPM) algorithm, and/or variations thereof. Patch matching processes may obtain image patches as input to one or more neural networks to extract patch features and evaluate the patches' similarities. A system for seatbelt localization may define or be otherwise provided with features, characteristics, behavior, and the like of a seatbelt patch, and utilize various patch matching processes to build an estimate seatbelt patch and refine the estimate seatbelt patch to determine a final seatbelt model. Patch matching may be over spatial and/or temporal dimensions.

Figure 7:
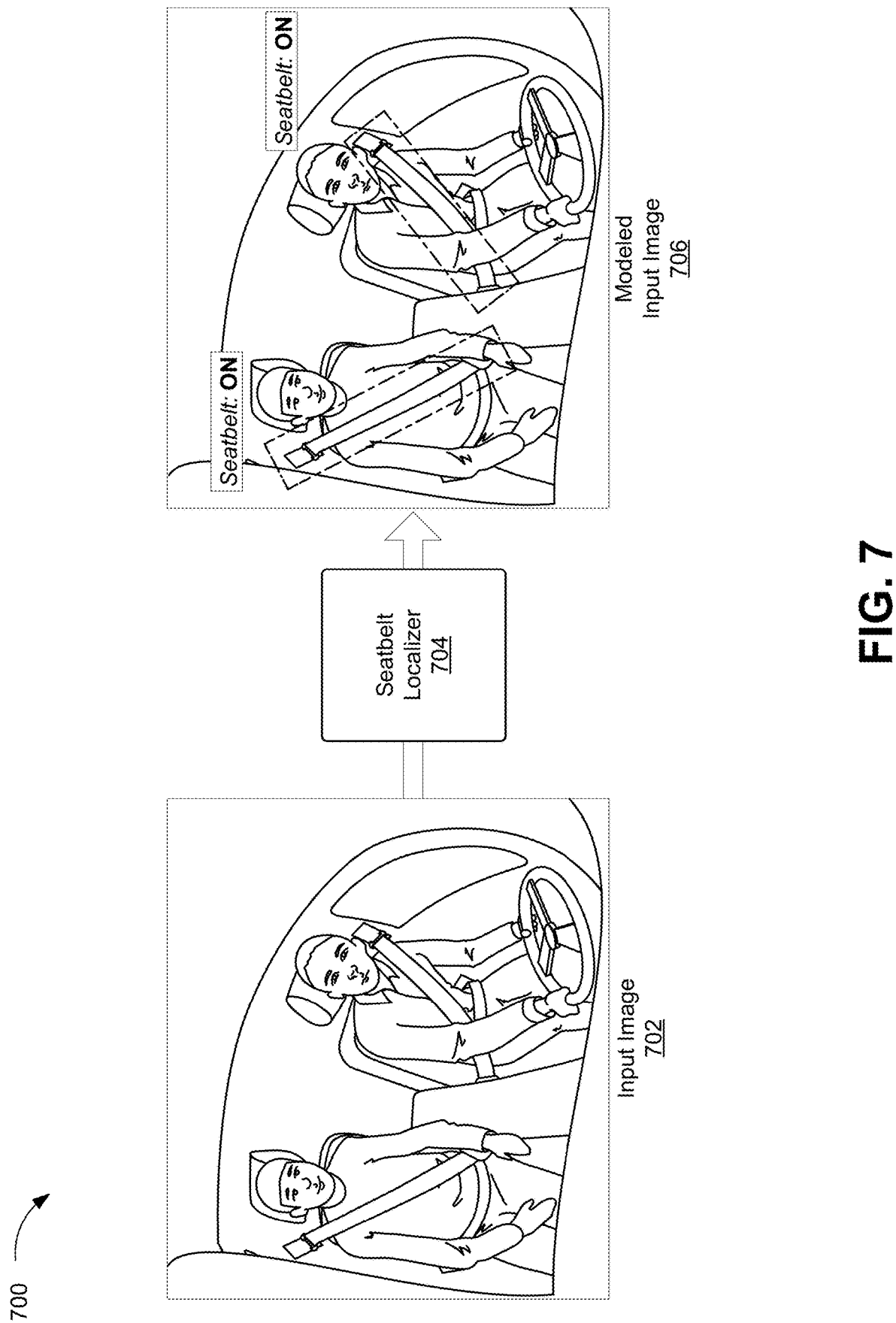
FIG. 7 illustrates an example of multiple seatbelt localization, in accordance with some embodiments of the present disclosure.

FIG. 7 illustrates an example 700 of multiple seatbelt localization, in accordance with at least one embodiment. An input image 702, a seatbelt localizer 704, and a modeled input image 706 may be in accordance with those described in connection with FIGS. 1-6. A seatbelt localizer 704 may be a collection of one or more hardware and/or software computing resources with executable instructions that, when executed, models one or more restraint devices from one or more images. A seatbelt localizer 704 may obtain or otherwise receive an input image 702, perform an initial classification of areas of the input image 702 that represent restraint devices (e.g., seatbelts), apply a set of constraints to the areas of the input image 702 to refine the initial classification to obtain a refined classification, and generate models of the restraint devices based at least in part on the refined classification. A seatbelt localizer 704 may identify and model multiple seatbelts depicted in an image (e.g., input image 702).

Referring to FIG. 7, an input image 702 may be an image captured from one or more cameras in an interior of a vehicle. An input image 702 may depict occupants of a vehicle, including a passenger, which may be depicted on the left, and a driver, which may be depicted on the right. An input image 702 may depict a passenger wearing a seatbelt correctly and a driver wearing a seatbelt correctly. A seatbelt localizer 704 may analyze an input image 702 to identify and model seatbelts of the input image 702. The seatbelt localizer 704 may visualize the modeled seatbelts through a modeled input image 706.

Referring to FIG. 7, a modeled input image 706 may depict an input image 702 with seatbelts and seatbelts statuses (e.g., orientation/position) indicated. A seatbelt localizer 704 may, in connection with a passenger depicted in an input image 702, perform an initial classification, refine the initial classification to obtain a refined classification, and generate a model based on the refined classification for the passenger's seatbelt, and, in connection with a driver depicted in the input image 702, perform a second initial classification, refine the second initial classification to obtain a second refined classification, and generate a second model based on the second refined classification for the driver's seatbelt.

A modeled input image 706 may comprise a first visual indication of a passenger's seatbelt with a corresponding label indicating a status of the passenger's seatbelt. Referring to FIG. 7, a modeled input image 706 may depict, on the left, a box that indicates a passenger's seatbelt and a label "Seatbelt: ON" that indicates that the passenger's seatbelt is worn and applied correctly. A modeled input image 706 may comprise a second visual indication of a driver's seatbelt with a corresponding label indicating a status of the driver's seatbelt. Referring to FIG. 7, a modeled input image 706 may depict, on the right, a box that indicates a driver's seatbelt and a label "Seatbelt: ON" that indicates that the driver's seatbelt is worn and applied correctly.

Figure 8:
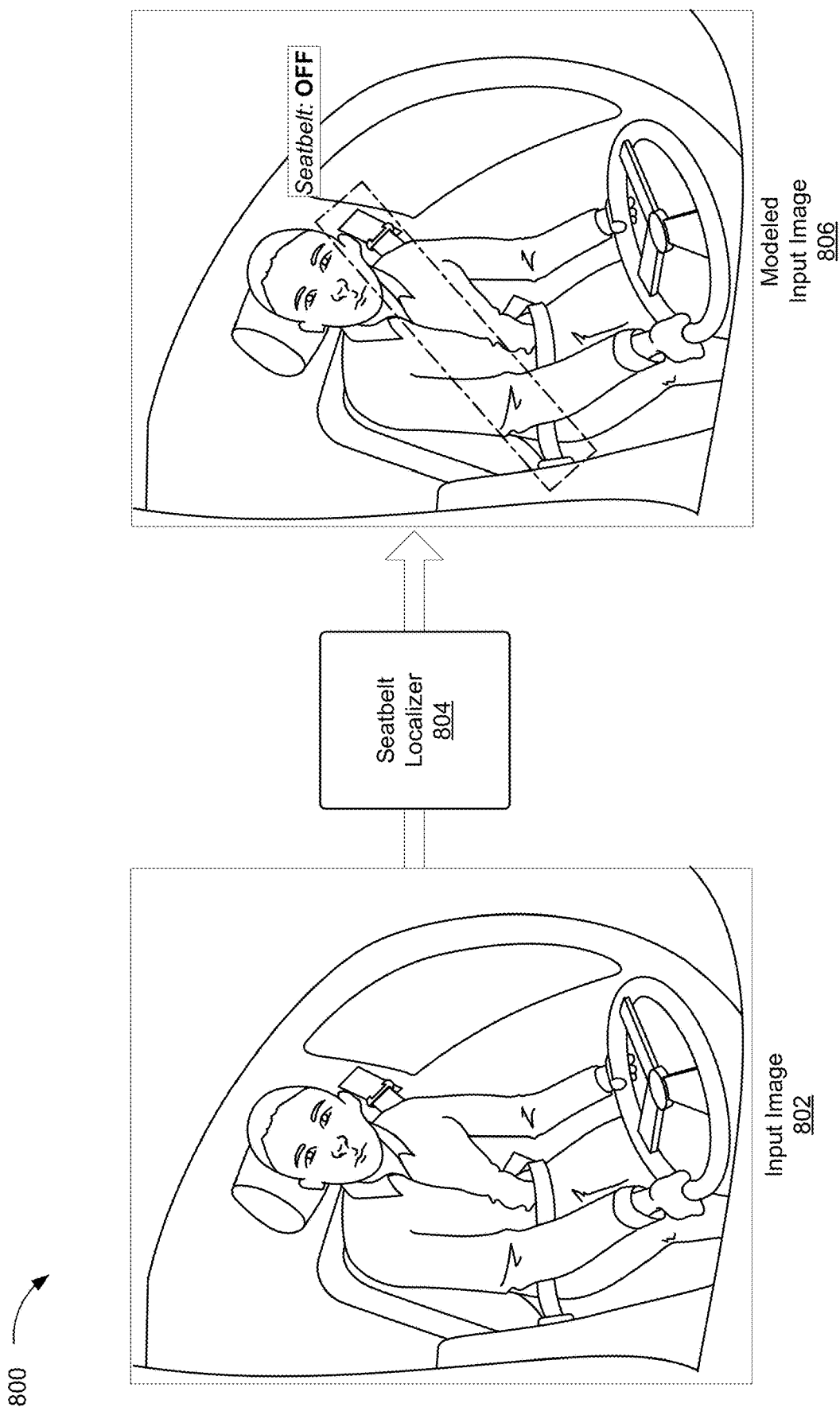
FIG. 8 illustrates an example of seatbelt localization, in accordance with some embodiments of the present disclosure.

FIG. 8 illustrates an example 800 of seatbelt localization, in accordance with at least one embodiment. An input image 802, a seatbelt localizer 804, and a modeled input image 806 may be in accordance with those described in connection with FIGS. 1-6. A seatbelt localizer 804 may be a collection of one or more hardware and/or software computing resources with executable instructions that, when executed, models one or more restraint devices from one or more images. A seatbelt localizer 804 may obtain or otherwise receive an input image 802, perform an initial classification of areas of the input image 802 that represent a restraint device (e.g., seatbelt), apply a set of constraints to the areas of the input image 802 to refine the initial classification to obtain a refined classification, and generate a model of the restraint device based at least in part on the refined classification. A seatbelt localizer 804 may identify and model a seatbelt depicted in an image (e.g., input image 802).

Referring to FIG. 8, an input image 802 may be an image captured from one or more cameras in an interior of a vehicle. An input image 802 may depict an occupant of a vehicle, including a driver, which may be depicted in the center. An input image 802 may depict a driver wearing a seatbelt incorrectly (e.g., the driver is wearing the seatbelt behind the back). A seatbelt localizer 804 may analyze an input image 802 to identify and model a seatbelt of the input image 802. The seatbelt localizer 804 may visualize the modeled seatbelt through a modeled input image 806.

Referring to FIG. 8, a modeled input image 806 may depict an input image 802 with a seatbelt and seatbelt status (e.g., orientation/position) indicated. A modeled input image 806 may comprise a first visual indication of a driver's seatbelt with a corresponding label indicating a status of the driver's seatbelt. Referring to FIG. 8, a modeled input image 806 may depict a box that indicates a driver's seatbelt and a label "Seatbelt: OFF" that indicates that the driver's seatbelt is worn but applied incorrectly.

Figure 9:
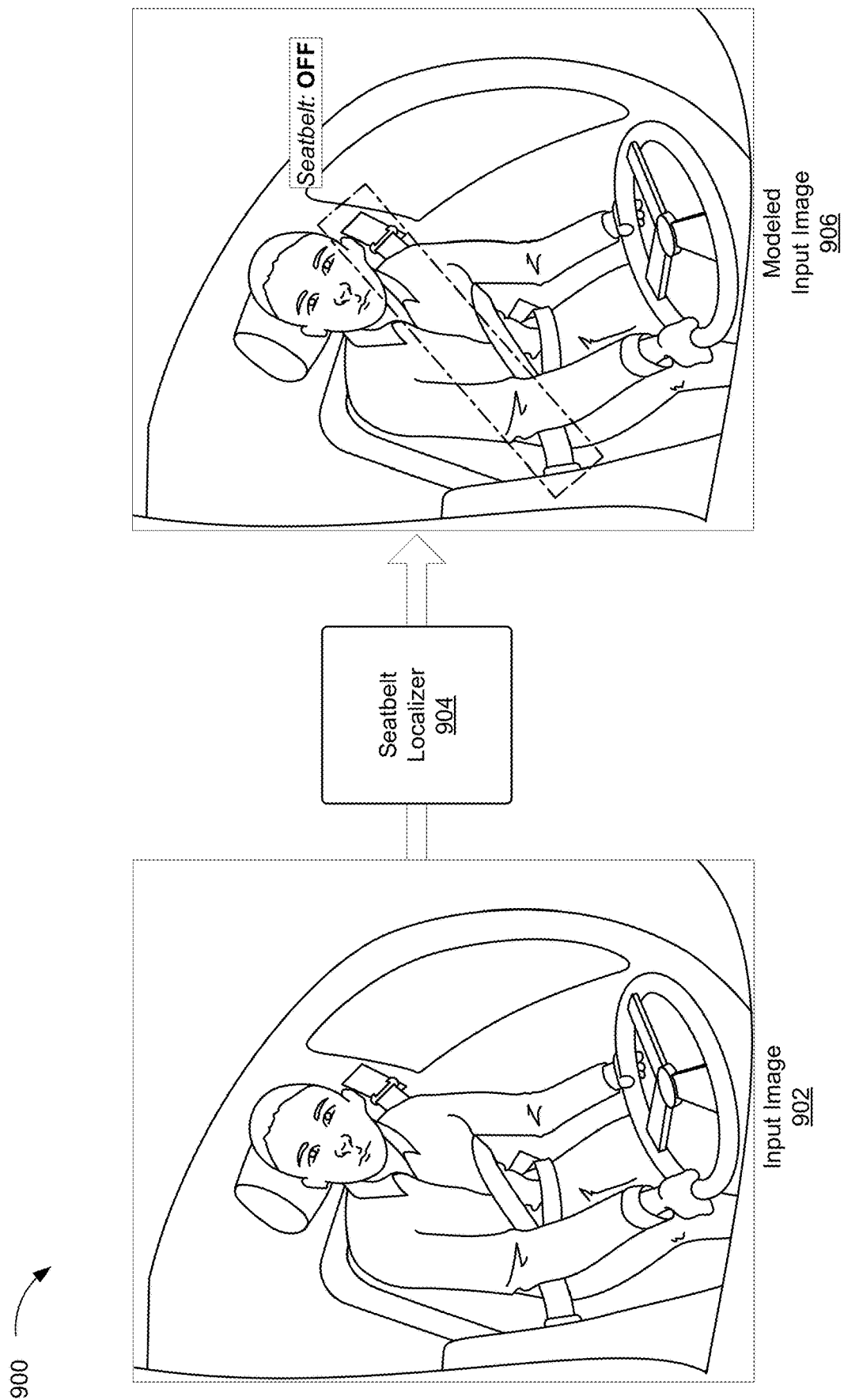
FIG. 9 illustrates an example of seatbelt localization, in accordance with some embodiments of the present disclosure.

FIG. 9 illustrates an example 900 of seatbelt localization, in accordance with at least one embodiment. An input image 902, a seatbelt localizer 904, and a modeled input image 906 may be in accordance with those described in connection with FIGS. 1-6. A seatbelt localizer 904 may be a collection of one or more hardware and/or software computing resources with executable instructions that, when executed, models one or more restraint devices from one or more images. A seatbelt localizer 904 may obtain or otherwise receive an input image 902, perform an initial classification of areas of the input image 902 that represent a restraint device (e.g., seatbelt), apply a set of constraints to the areas of the input image 902 to refine the initial classification to obtain a refined classification, and generate a model of the restraint device based at least in part on the refined classification. A seatbelt localizer 904 may identify and model a seatbelt depicted in an image (e.g., input image 902).

Referring to FIG. 9, an input image 902 may be an image captured from one or more cameras in an interior of a vehicle. An input image 902 may depict an occupant of a vehicle, including a driver, which may be depicted in the center. An input image 902 may depict a driver wearing a seatbelt incorrectly (e.g., the driver is wearing the seatbelt under the armpit). A seatbelt localizer 904 may analyze an input image 902 to identify and model a seatbelt of the input image 902. The seatbelt localizer 904 may visualize the modeled seatbelt through a modeled input image 906.

Referring to FIG. 9, a modeled input image 906 may depict an input image 902 with a seatbelt and seatbelt status (e.g., orientation/position) indicated. A modeled input image 906 may comprise a first visual indication of a driver's seatbelt with a corresponding label indicating a status of the driver's seatbelt. Referring to FIG. 9, a modeled input image 906 may depict a box that indicates a driver's seatbelt and a label "Seatbelt: OFF" that indicates that the driver's seatbelt is worn but applied incorrectly.

Figure 10:
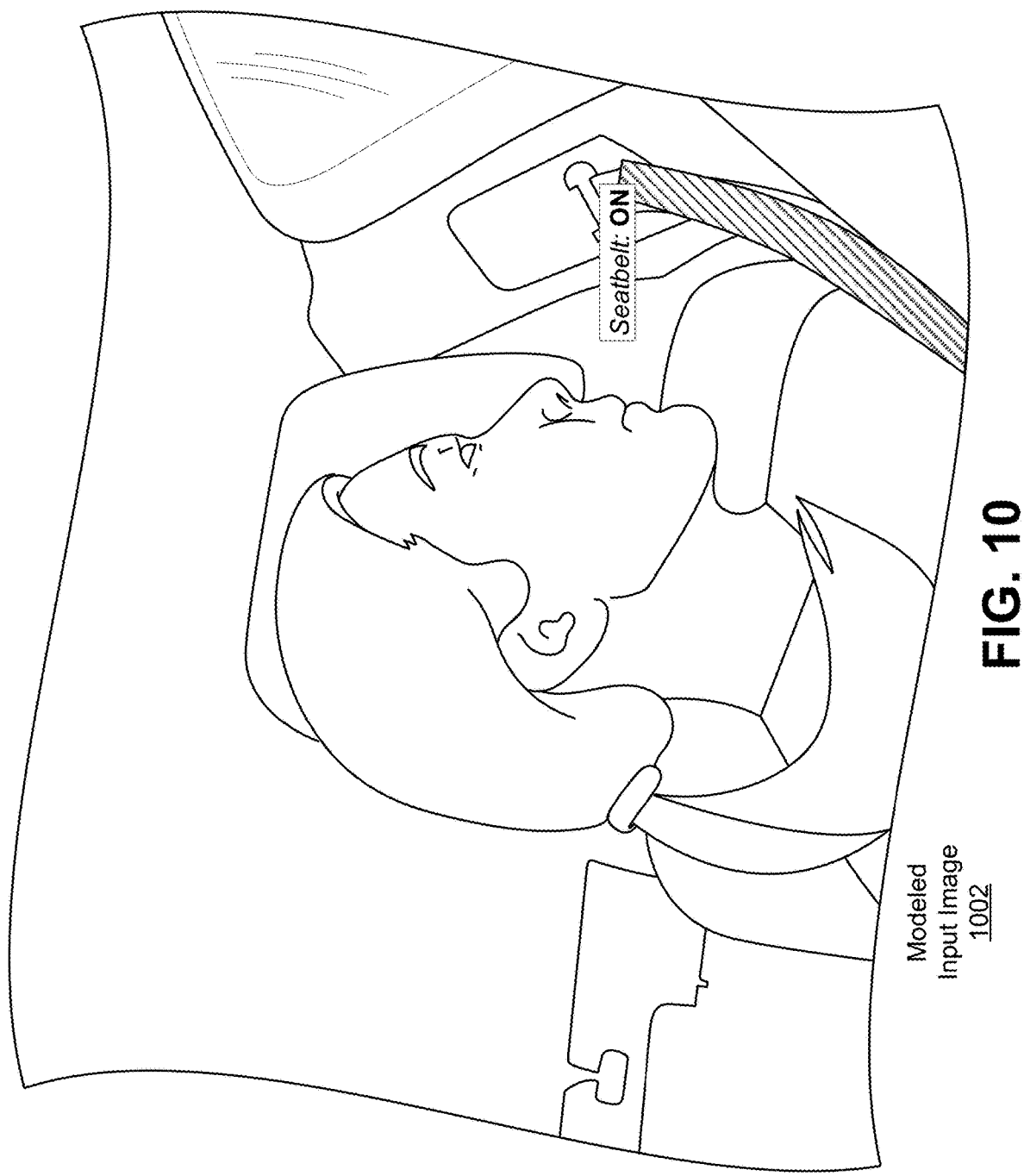
FIG. 10 illustrates an example of seatbelt localization, in accordance with some embodiments of the present disclosure.

FIG. 10 illustrates an example 1000 of seatbelt localization, in accordance with at least one embodiment. A modeled input image 1002 may be in accordance with those described in connection with FIGS. 1-6. A seatbelt localizer may be a collection of one or more hardware and/or software computing resources with executable instructions that, when executed, models one or more restraint devices from one or more images. A seatbelt localizer may obtain or otherwise receive an input image, perform an initial classification of areas of the input image that represent a restraint device (e.g., seatbelt), apply a set of constraints to the areas of the input image to refine the initial classification to obtain a refined classification, generate a model of the restraint device based at least in part on the refined classification, and visualize the model as a modeled input image 1002.

A modeled input image 1002 may be based on an input image that may be captured from one or more cameras. The input image may be captured from a camera with a standard FOV. A seatbelt localizer may identify and model one or more seatbelts from images of any FOV. A seatbelt localizer may identify and model one or more seatbelts from images that may depict portions of seatbelts. Referring to FIG. 10, a modeled input image 1002 may depict a standard FOV image with a seatbelt identified by a shaded region and a corresponding label "Seatbelt: ON" indicating that the seatbelt is worn and applied correctly.

Figure 11:
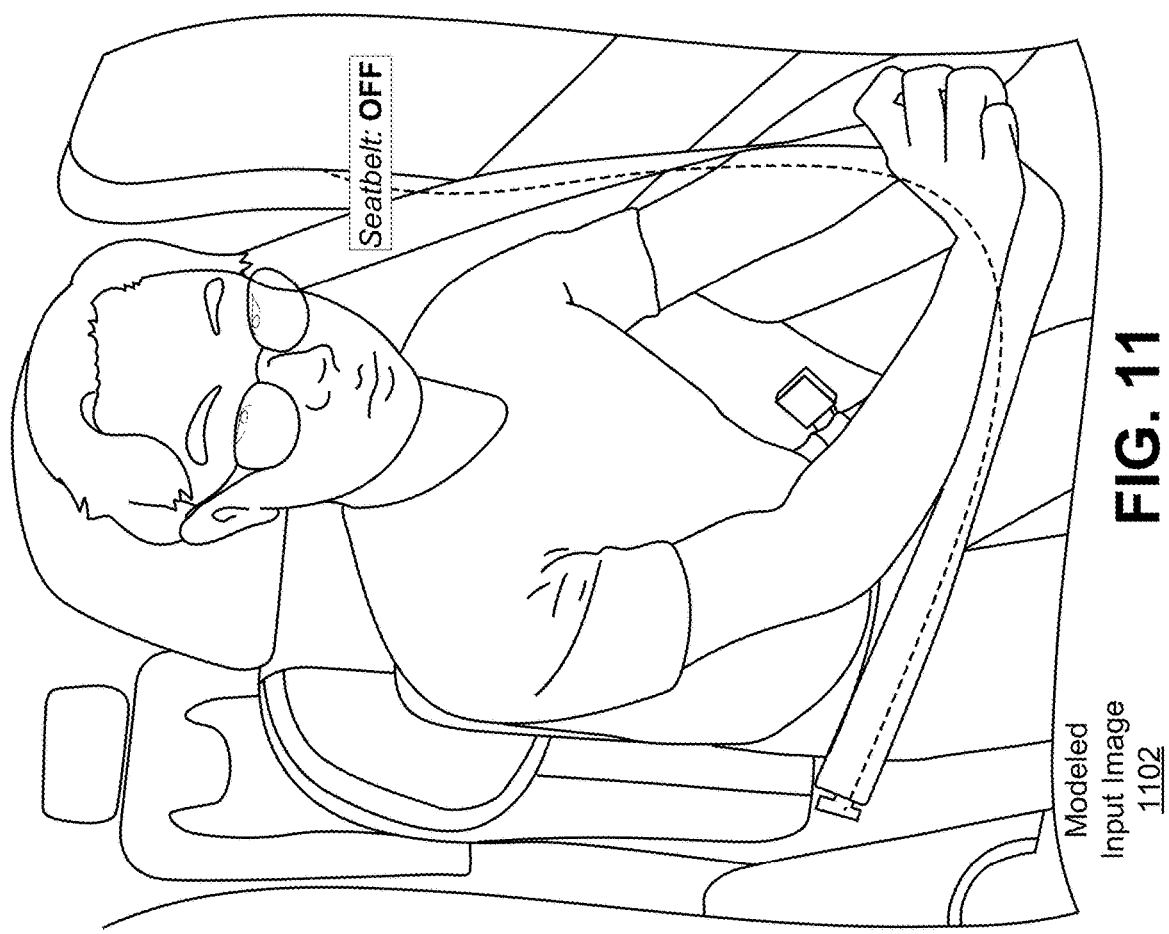
FIG. 11 illustrates an example of seatbelt localization, in accordance with some embodiments of the present disclosure.

FIG. 11 illustrates an example 1100 of seatbelt localization, in accordance with at least one embodiment. A modeled input image 1102 may be in accordance with those described in connection with FIGS. 1-6. A seatbelt localizer may be a collection of one or more hardware and/or software computing resources with executable instructions that, when executed, models one or more restraint devices from one or more images. A seatbelt localizer may obtain or otherwise receive an input image, perform an initial classification of areas of the input image that represent a restraint device (e.g., seatbelt), apply a set of constraints to the areas of the input image to refine the initial classification to obtain a refined classification, generate a model of the restraint device based at least in part on the refined classification, and visualize the model as a modeled input image 1102.

A modeled input image 1102 may be based on an input image that may be captured from one or more cameras. The input image may depict a driver that has pushed a seatbelt away from the driver's body. A seatbelt localizer may identify and model one or more seatbelts from images that depict the one or more seatbelts in any suitable position (e.g., pushed away, stretched out, pulled in). Referring to FIG. 11, a modeled input image 1102 may depict an image with a seatbelt identified by a dotted curve and a corresponding label "Seatbelt: OFF" indicating that the seatbelt is worn but not applied correctly.

It should be noted that, while FIGS. 7-11 depict examples of a seatbelt localizer identifying, modeling, visualizing, and labeling one or more seatbelts, the seatbelt localizer may identify, model, visualize, and label one or more seatbelts in any suitable manner. A seatbelt localizer may visualize one or more seatbelts in an image by indicating the one or more seatbelts through an outline, box, curve, bounding box, shaded region, patterned region, or other indication. A seatbelt localizer may label one or more seatbelts in an image through various indications, such as symbols, characters, labels, or other indications. Indications that a seatbelt is worn and applied correctly may be denoted in various ways, such as displaying text on a display screen in the vehicle that indicates: "Seatbelt: ON," "Seatbelt: Applied," "Seatbelt: Applied Correctly," and the like. Indications that a seatbelt is worn but applied incorrectly may be denoted in various ways, such as "Seatbelt: OFF," "Seatbelt: Incorrect," "Seatbelt: Applied Incorrectly," and the like. Indications that a seatbelt is not worn may be denoted in various ways, such as "Seatbelt: OFF," "Seatbelt: Not Applied," "Seatbelt Not Applied," and the like. Indications may also include audio indications (e.g., computer speech indications), visual indications (e.g., indicating lights, switches), physical indications (e.g., indicating vibrations), and the like.

Figure 12:
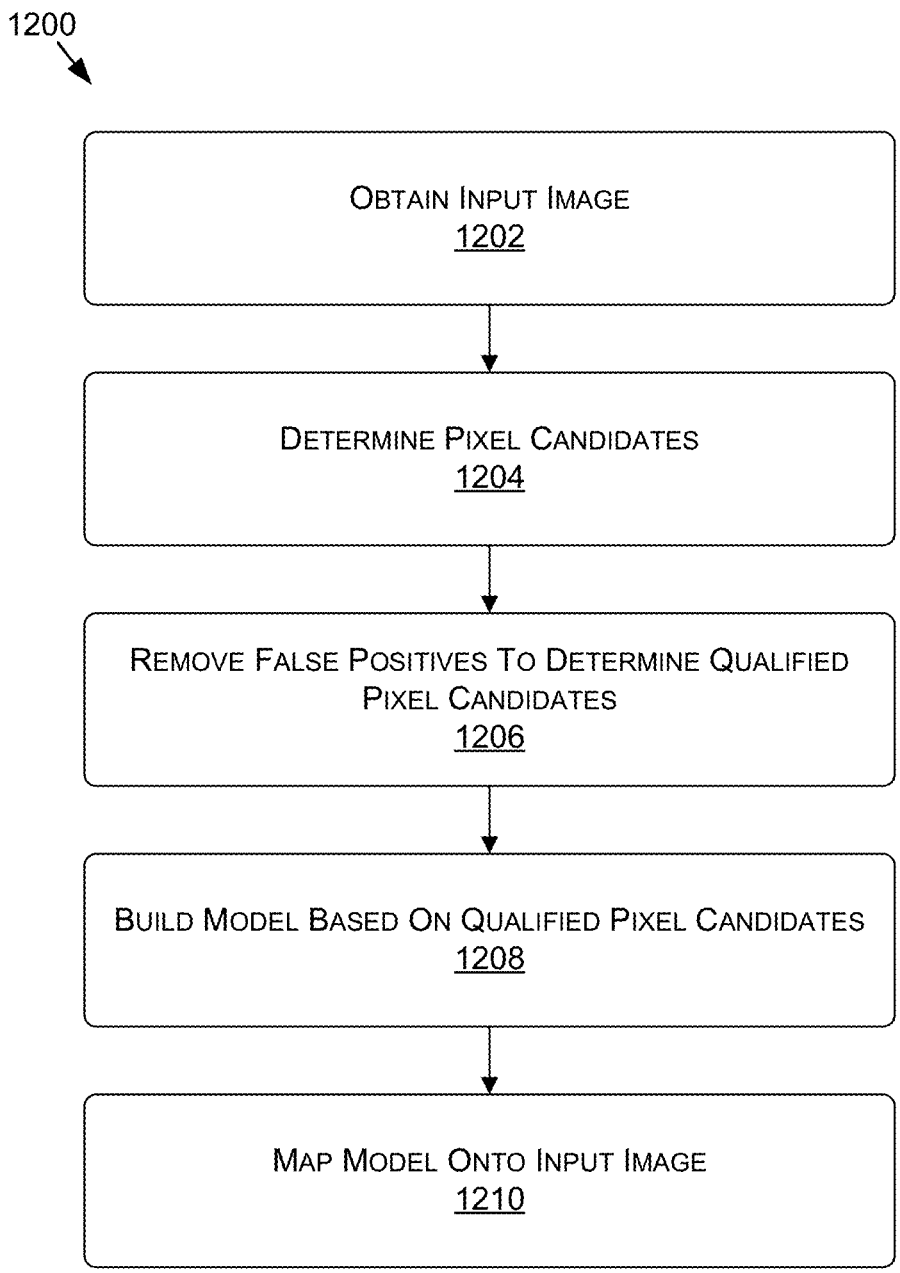
FIG. 12 is a flow diagram showing a method for generating a model for an input image, in accordance with some embodiments of the present disclosure.

Now referring to FIG. 12, each block of method 1200, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, method 1200 is described, by way of example, with respect to a system for seatbelt localization of FIG. 1. However, these methods may additionally or alternatively be executed by any one system, or any combination of systems, including, but not limited to, those described herein.

FIG. 12 is a flow diagram showing a method 1200 for generating a model for an input image, in accordance with some embodiments of the present disclosure. The method 1200, at block 1202, includes obtaining an input image. The input image may represent a subject, such as a driver, passenger, or other occupant, and a restraint device applied to the subject, such as a seatbelt, safety harness, or other restraint device. The input image may be an image captured from one or more image capturing devices, such as a camera or other device, which may be located in an interior of a vehicle.

The method 1200, at block 1204, includes determining pixel candidates. A system performing at least part of the method 1200 may perform an initial classification on areas of the image as representing the restraint device. The initial classification may result in determination of the pixel candidates. For any given pixel of the input image, a system may predict whether the pixel belongs to a seatbelt or is a background pixel, using the pixel and its neighborhood pixels information. A system may determine areas of the input image that depict or otherwise represent a restraint device (e.g., seatbelt) to determine the pixel candidates.

The method 1200, at block 1206, includes removing false positives to determine qualified pixel candidates. A system performing at least part of the method 1200 may apply a set of constraints to the areas of the image to refine the initial classification to obtain a refined classification. The refined classification may result in determination of the qualified pixel candidates. The set of constraints may include characteristics such as parameters of a camera that captured the input image (e.g., camera lens dimensions, focal point, principal point, distortion parameters), standard seatbelt dimension ranges (e.g., width and/or length ranges), standard seatbelt characteristics and/or parameters (e.g., standard seatbelt colors, material), vehicle parameters (e.g., vehicle layout, vehicle components), and the like. A system may apply the set of constraints to pixel candidates such that pixels of pixel candidates that do not adhere to or otherwise conform to the set of constraints may be removed to determine qualified pixel candidates.

The method 1200, at block 1208, includes building a model based on the qualified pixel candidates. A system performing at least part of the method 1200 may generate a model of the restraint device based at least in part on the refined classification. A system may generate the model based on pixels of the qualified pixel candidates that correspond to a seatbelt. The method 1200, at block 1210, includes mapping the model onto the input image. A system may visualize the model onto the input image as a modeled input image. The modeled input image may comprise indications of a position/orientation/location of a seatbelt, as well as a status of the seatbelt that indicates if the seatbelt is worn, not worn, applied, or applied incorrectly.

Example Autonomous Vehicle

Figure 13A:
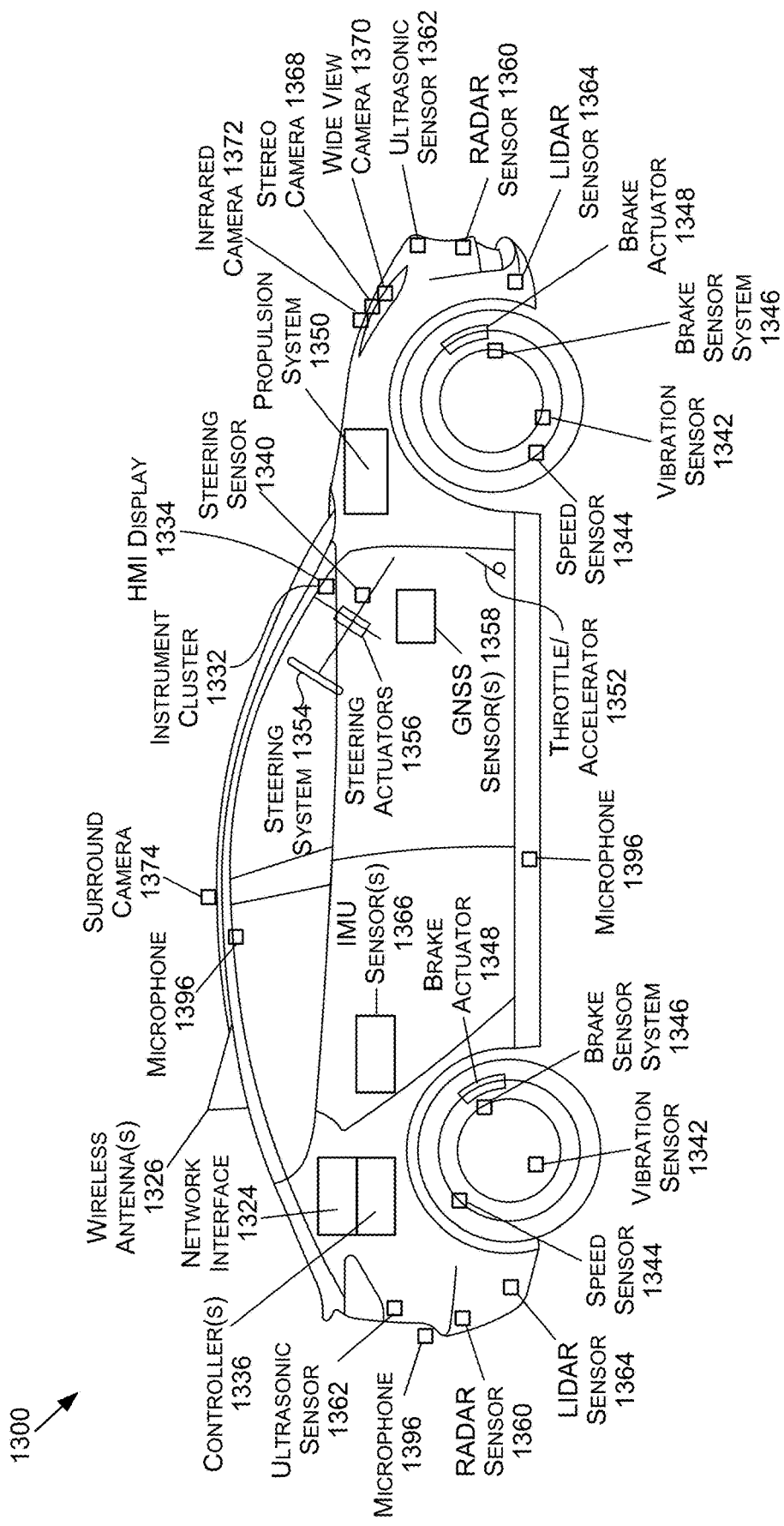
FIG. 13A is an illustration of an example autonomous vehicle, in accordance with some embodiments of the present disclosure.

FIG. 13A is an illustration of an example autonomous vehicle 1300, in accordance with some embodiments of the present disclosure. The autonomous vehicle 1300 (alternatively referred to herein as the "vehicle 1300") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1300 may be capable of functionality in accordance with one or more of Level 3-Level 5 of the autonomous driving levels. For example, the vehicle 1300 may be capable of conditional automation (Level 3), high automation (Level 4), and/or full automation (Level 5), depending on the embodiment.

The vehicle 1300 may include components such as a chassis, a vehicle body, wheels (e.g., 2, 4, 6, 8, 18, etc.), tires, axles, and other components of a vehicle. The vehicle 1300 may include a propulsion system 1350, such as an internal combustion engine, hybrid electric power plant, an all-electric engine, and/or another propulsion system type. The propulsion system 1350 may be connected to a drive train of the vehicle 1300, which may include a transmission, to enable the propulsion of the vehicle 1300. The propulsion system 1350 may be controlled in response to receiving signals from the throttle/accelerator 1352.

A steering system 1354, which may include a steering wheel, may be used to steer the vehicle 1300 (e.g., along a desired path or route) when the propulsion system 1350 is operating (e.g., when the vehicle is in motion). The steering system 1354 may receive signals from a steering actuator 1356. The steering wheel may be optional for full automation (Level 5) functionality.

The brake sensor system 1346 may be used to operate the vehicle brakes in response to receiving signals from the brake actuators 1348 and/or brake sensors.

Controller(s) 1336, which may include one or more CPU(s), system on chips (SoCs) 1304 (FIG. 13C) and/or GPU(s), may provide signals (e.g., representative of commands) to one or more components and/or systems of the vehicle 1300. For example, the controller(s) may send signals to operate the vehicle brakes via one or more brake actuators 1348, to operate the steering system 1354 via one or more steering actuators 1356, and/or to operate the propulsion system 1350 via one or more throttle/accelerators 1352. The controller(s) 1336 may include one or more onboard (e.g., integrated) computing devices (e.g., supercomputers) that process sensor signals, and output operation commands (e.g., signals representing commands) to enable autonomous driving and/or to assist a human driver in driving the vehicle 1300. The controller(s) 1336 may include a first controller 1336 for autonomous driving functions, a second controller 1336 for functional safety functions, a third controller 1336 for artificial intelligence functionality (e.g., computer vision), a fourth controller 1336 for infotainment functionality, a fifth controller 1336 for redundancy in emergency conditions, and/or other controllers. In some examples, a single controller 1336 may handle two or more of the above functionalities, two or more controllers 1336 may handle a single functionality, and/or any combination thereof.

The controller(s) 1336 may provide the signals for controlling one or more components and/or systems of the vehicle 1300 in response to sensor data received from one or more sensors (e.g., sensor inputs). The sensor data may be received from, for example and without limitation, global navigation satellite systems sensor(s) 1358 (e.g., Global Positioning System sensor(s)), RADAR sensor(s) 1360, ultrasonic sensor(s) 1362, LIDAR sensor(s) 1364, inertial measurement unit (IMU) sensor(s) 1366 (e.g., accelerometer(s), gyroscope(s), magnetic compass(es), magnetometer(s), etc.), microphone(s) 1396, stereo camera(s) 1368, wide-view camera(s) 1370 (e.g., fisheye cameras), infrared camera(s) 1372, surround camera(s) 1374 (e.g., 360 degree cameras), long-range and/or mid-range camera(s) 1398, speed sensor(s) 1344 (e.g., for measuring the speed of the vehicle 1300), vibration sensor(s) 1342, steering sensor(s) 1340, brake sensor(s) 1346 (e.g., as part of the brake sensor system 1346), and/or other sensor types.

One or more of the controller(s) 1336 may receive inputs (e.g., represented by input data) from an instrument cluster 1332 of the vehicle 1300 and provide outputs (e.g., represented by output data, display data, etc.) via a human-machine interface (HMI) display 1334, an audible annunciator, a loudspeaker, and/or via other components of the vehicle 1300. The outputs may include information such as vehicle velocity, speed, time, map data (e.g., the HD map 1322 of FIG. 13C), location data (e.g., the location of the vehicle 1300, such as on a map), direction, location of other vehicles (e.g., an occupancy grid), information about objects and status of objects as perceived by the controller(s) 1336, etc. For example, the HMI display 1334 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1300 further includes a network interface 1324, which may use one or more wireless antenna(s) 1326 and/or modem(s) to communicate over one or more networks. For example, the network interface 1324 may be capable of communication over LTE, WCDMA, UMTS, GSM, CDMA2000, etc. The wireless antenna(s) 1326 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 13B:
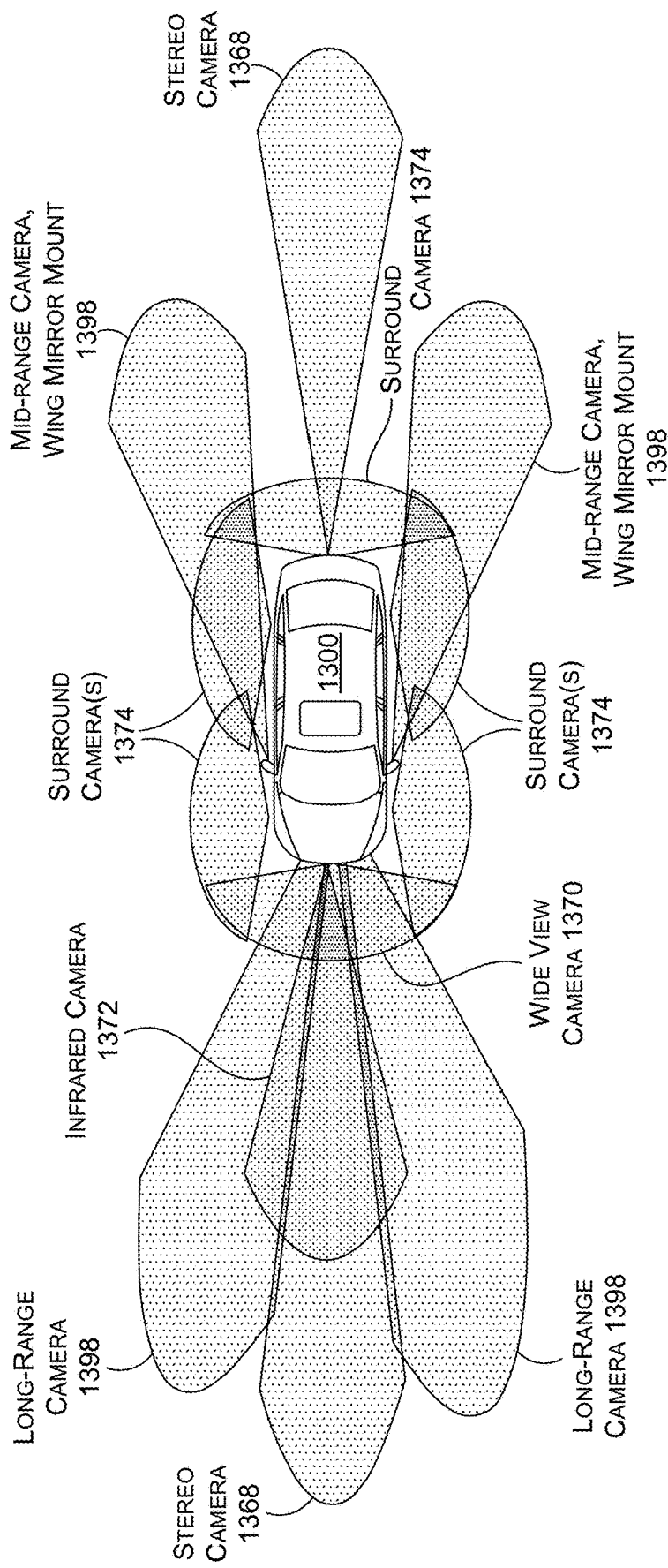
FIG. 13B is an example of camera locations and fields of view for the example autonomous vehicle of FIG. 13A, in accordance with some embodiments of the present disclosure.

FIG. 13B is an example of camera locations and fields of view for the example autonomous vehicle 1300 of FIG. 13A, in accordance with some embodiments of the present disclosure. The cameras and respective fields of view are one example embodiment and are not intended to be limiting. For example, additional and/or alternative cameras may be included and/or the cameras may be located at different locations on the vehicle 1300.

The camera types for the cameras may include, but are not limited to, digital cameras that may be adapted for use with the components and/or systems of the vehicle 1300. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom-designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that includes portions of the environment in front of the vehicle 1300 (e.g., front-facing cameras) may be used for surround view, to help identify forward-facing paths and obstacles, as well aid in, with the help of one or more controllers 1336 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 1370 that may be used to perceive objects coming into view from the periphery (e.g., pedestrians, crossing traffic or bicycles). Although only one wide-view camera is illustrated in FIG. 13B, there may any number of wide-view cameras 1370 on the vehicle 1300. In addition, long-range camera(s) 1398 (e.g., a long-view stereo camera pair) may be used for depth-based object detection, especially for objects for which a neural network has not yet been trained. The long-range camera(s) 1398 may also be used for object detection and classification, as well as basic object tracking.

One or more stereo cameras 1368 may also be included in a front-facing configuration. The stereo camera(s) 1368 may include an integrated control unit comprising a scalable processing unit, which may provide a programmable logic (e.g., FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 1368 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1368 may be used in addition to, or alternatively from, those described herein.

Cameras with a field of view that includes portions of the environment to the side of the vehicle 1300 (e.g., side-view cameras) may be used for surround view, providing information used to create and update the occupancy grid, as well as to generate side impact collision warnings. For example, surround camera(s) 1374 (e.g., four surround cameras 1374 as illustrated in FIG. 13B) may be positioned around the vehicle 1300. The surround camera(s) 1374 may include wide-view camera(s) 1370, fisheye camera(s), 360-degree camera(s), and/or the like. For example, four fisheye cameras may be positioned on the vehicle's front, rear, and sides. In an alternative arrangement, the vehicle may use three surround camera(s) 1374 (e.g., left, right, and rear), and may leverage one or more other camera(s) (e.g., a forward-facing camera) as a fourth surround-view camera.

Cameras with a field of view that include portions of the environment to the rear of the vehicle 1300 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1398, stereo camera(s) 1368), infrared camera(s) 1372, etc.), as described herein.

Figure 13C:
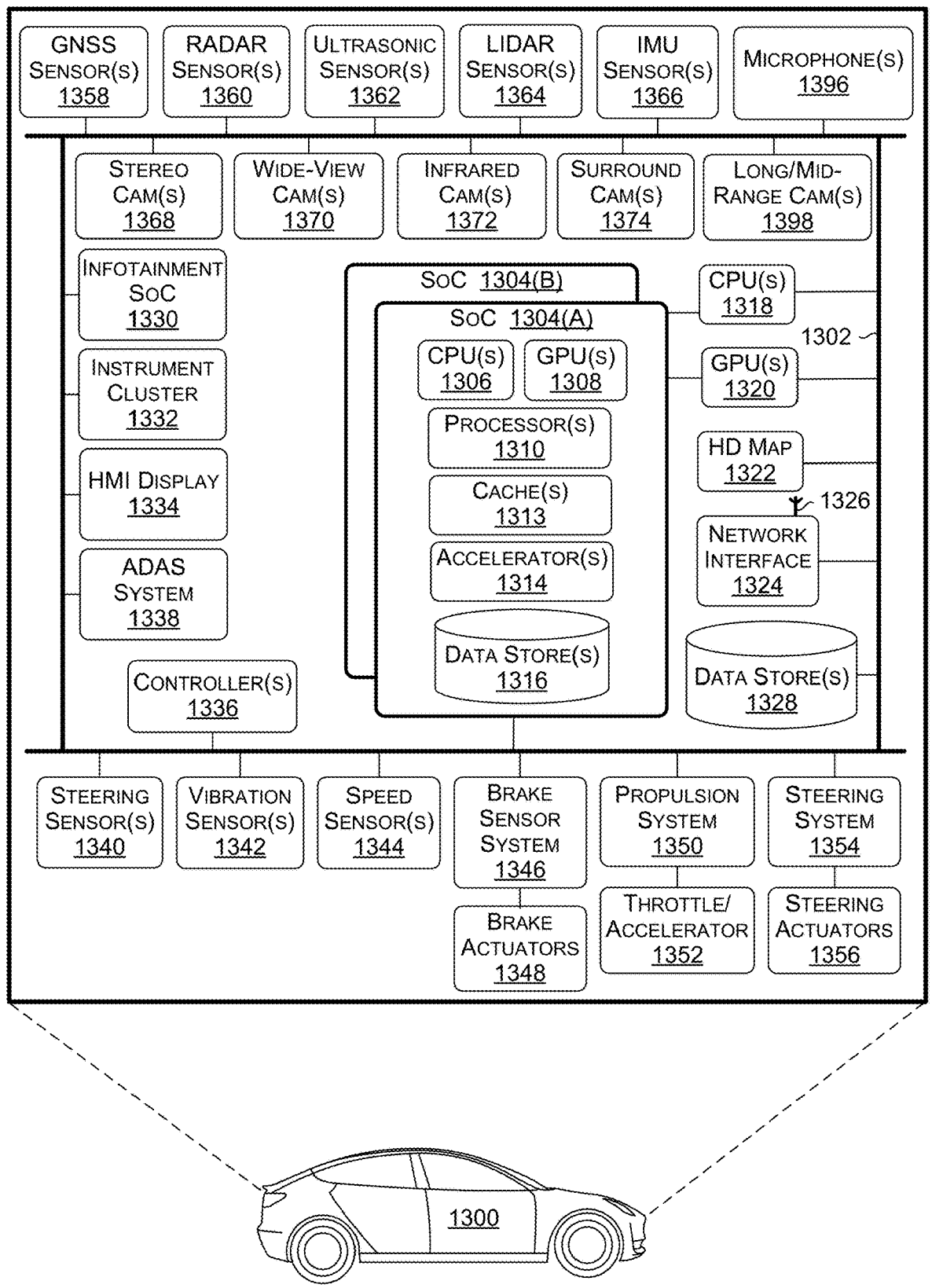
FIG. 13C is a block diagram of an example system architecture for the example autonomous vehicle of FIG. 13A, in accordance with some embodiments of the present disclosure.

FIG. 13C is a block diagram of an example system architecture for the example autonomous vehicle 1300 of FIG. 13A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1300 in FIG. 13C is illustrated as being connected via bus 1302. The bus 1302 may include a Controller Area Network (CAN) data interface (alternatively referred to herein as a "CAN bus"). A CAN may be a network inside the vehicle 1300 used to aid in control of various features and functionality of the vehicle 1300, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1302 is described herein as being a CAN bus, this is not intended to be limiting. For example, in addition to, or alternatively from, the CAN bus, FlexRay and/or Ethernet may be used. Additionally, although a single line is used to represent the bus 1302, this is not intended to be limiting. For example, there may be any number of busses 1302, which may include one or more CAN busses, one or more FlexRay busses, one or more Ethernet busses, and/or one or more other types of busses using a different protocol.

In some examples, two or more busses 1302 may be used to perform different functions, and/or may be used for redundancy. For example, a first bus 1302 may be used for collision avoidance functionality and a second bus 1302 may be used for actuation control. In any example, each bus 1302 may communicate with any of the components of the vehicle 1300, and two or more busses 1302 may communicate with the same components. In some examples, each SoC 1304, each controller 1336, and/or each computer within the vehicle may have access to the same input data (e.g., inputs from sensors of the vehicle 1300), and may be connected to a common bus, such the CAN bus.

The vehicle 1300 may include one or more controller(s) 1336, such as those described herein with respect to FIG. 13A. The controller(s) 1336 may be used for a variety of functions. The controller(s) 1336 may be coupled to any of the various other components and systems of the vehicle 1300 and may be used for control of the vehicle 1300, artificial intelligence of the vehicle 1300, infotainment for the vehicle 1300, and/or the like.

The vehicle 1300 may include a system(s) on a chip (SoC) 1304. The SoC 1304 may include CPU(s) 1306, GPU(s) 1308, processor(s) 1310, cache(s) 1312, accelerator(s) 1314, data store(s) 1316, and/or other components and features not illustrated. The SoC(s) 1304 may be used to control the vehicle 1300 in a variety of platforms and systems. For example, the SoC(s) 1304 may be combined in a system (e.g., the system of the vehicle 1300) with an HD map 1322 which may obtain map refreshes and/or updates via a network interface 1324 from one or more servers (e.g., server(s) 1378 of FIG. 13D).

The CPU(s) 1306 may include a CPU cluster or CPU complex (alternatively referred to herein as a "CCPLEX"). The CPU(s) 1306 may include multiple cores and/or L2 caches. For example, in some embodiments, the CPU(s) 1306 may include eight cores in a coherent multi-processor configuration. In some embodiments, the CPU(s) 1306 may include four dual-core clusters where each cluster has a dedicated L2 cache (e.g., a 2 MB L2 cache). The CPU(s) 1306 (e.g., the CCPLEX) may be configured to support simultaneous cluster operation enabling any combination of the clusters of the CPU(s) 1306 to be active at any given time.

The CPU(s) 1306 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1306 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1308 may include an integrated GPU (alternatively referred to herein as an "iGPU"). The GPU(s) 1308 may be programmable and may be efficient for parallel workloads. The GPU(s) 1308, in some examples, may use an enhanced tensor instruction set. The GPU(s) 1308 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1308 may include at least eight streaming microprocessors. The GPU(s) 1308 may use computer-based application programming interface(s) (API (s)). In addition, the GPU(s) 1308 may use one or more parallel computing platforms and/or programming models (e.g., NVIDIA's CUDA).

The GPU(s) 1308 may be power-optimized for best performance in automotive and embedded use cases. For example, the GPU(s) 1308 may be fabricated on a Fin field-effect transistor (FinFET). However, this is not intended to be limiting, and the GPU(s) 1308 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread-scheduling capability to enable finer-grain synchronization and cooperation between parallel threads. The streaming microprocessors may include a combined L1 data cache and shared memory unit in order to improve performance while simplifying programming.

The GPU(s) 1308 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1308 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1308 to access the CPU(s) 1306 page tables directly. In such examples, when the GPU(s) 1308 memory management unit (MMU) experiences a miss, an address translation request may be transmitted to the CPU(s) 1306. In response, the CPU(s) 1306 may look in its page tables for the virtual-to-physical mapping for the address and transmits the translation back to the GPU(s) 1308. As such, unified memory technology may allow a single unified virtual address space for memory of both the CPU(s) 1306 and the GPU(s) 1308, thereby simplifying the GPU(s) 1308 programming and porting of applications to the GPU(s) 1308.

In addition, the GPU(s) 1308 may include an access counter that may keep track of the frequency of access of the GPU(s) 1308 to memory of other processors. The access counter may help ensure that memory pages are moved to the physical memory of the processor that is accessing the pages most frequently.

The SoC(s) 1304 may include any number of cache(s) 1312, including those described herein. For example, the cache(s) 1312 may include an L3 cache that is available to both the CPU(s) 1306 and the GPU(s) 1308 (e.g., that is connected to both the CPU(s) 1306 and the GPU(s) 1308). The cache(s) 1312 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1304 may include an arithmetic logic unit(s) (ALU(s)) which may be leveraged in performing processing with respect to any of the variety of tasks or operations of the vehicle 1300—such as processing DNNs. In addition, the SoC(s) 1304 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 1306 and/or GPU(s) 1308.

The SoC(s) 1304 may include one or more accelerators 1314 (e.g., hardware accelerators, software accelerators, or a combination thereof). For example, the SoC(s) 1304 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1308 and to off-load some of the tasks of the GPU(s) 1308 (e.g., to free up more cycles of the GPU(s) 1308 for performing other tasks). As an example, the accelerator(s) 1314 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1314 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1308, and by using an inference accelerator, for example, a designer may target either the DLA(s) or the GPU(s) 1308 for any function. For example, the designer may focus processing of CNNs and floating point operations on the DLA(s) and leave other functions to the GPU(s) 1308 and/or other accelerator(s) 1314.

The accelerator(s) 1314 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1306. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1314 (e.g., the hardware acceleration cluster) may include a computer vision network on-chip and SRAM, for providing a high-bandwidth, low latency SRAM for the accelerator(s) 1314. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1304 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 1314 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.).

The PVA may perform computer stereo vision function on inputs from two monocular cameras.

In some examples, the PVA may be used to perform dense optical flow. For example, the PVA may be used to process raw RADAR data (e.g., using a 4D Fast Fourier Transform) to provide a processed RADAR signal before emitting the next RADAR pulse. In other examples, the PVA is used for time of flight depth processing, by processing raw time of flight data to provide processed time of flight data, for example.

The DLA may be used to run any type of network to enhance control and driving safety, including, for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1366 output that correlates with the vehicle 1300 orientation, distance, 3D location estimates of the object obtained from the neural network and/or other sensors (e.g., LIDAR sensor(s) 1364 or RADAR sensor(s) 1360), among others.

The SoC(s) 1304 may include data store(s) 1316 (e.g., memory). The data store(s) 1316 may be on-chip memory of the SoC(s) 1304, which may store neural networks to be executed on the GPU and/or the DLA. In some examples, the data store(s) 1316 may be large enough in capacity to store multiple instances of neural networks for redundancy and safety. The data store(s) 1316 may comprise L2 or L3 cache(s) 1312. Reference to the data store(s) 1316 may include reference to the memory associated with the PVA, DLA, and/or other accelerator(s) 1314, as described herein.

The SoC(s) 1304 may include one or more processor(s) 1310 (e.g., embedded processors). The processor(s) 1310 may include a boot and power management processor that may be a dedicated processor and subsystem to handle boot power and management functions and related security enforcement. The boot and power management processor may be a part of the SoC(s) 1304 boot sequence and may provide runtime power management services. The boot power and management processor may provide clock and voltage programming, assistance in system low power state transitions, management of SoC(s) 1304 thermals and temperature sensors, and/or management of the SoC(s) 1304 power states. Each temperature sensor may be implemented as a ring-oscillator whose output frequency is proportional to temperature, and the SoC(s) 1304 may use the ring-oscillators to detect temperatures of the CPU(s) 1306, GPU(s) 1308, and/or accelerator(s) 1314. If temperatures are determined to exceed a threshold, the boot and power management processor may enter a temperature fault routine and put the SoC(s) 1304 into a lower power state and/or put the vehicle 1300 into a chauffeur to safe-stop mode (e.g., bring the vehicle 1300 to a safe stop).

The processor(s) 1310 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1310 may further include an always-on processor engine that may provide necessary hardware features to support low power sensor management and wake use cases. The always-on processor engine may include a processor core, a tightly coupled RAM, supporting peripherals (e.g., timers and interrupt controllers), various I/O controller peripherals, and routing logic.

The processor(s) 1310 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1310 may further include a real-time camera engine that may include a dedicated processor subsystem for handling real-time camera management.

The processor(s) 1310 may further include a high dynamic range signal processor that may include an image signal processor that is a hardware engine that is part of the camera processing pipeline.

The processor(s) 1310 may include a video image compositor that may be a processing block (e.g., implemented on a microprocessor) that implements video post-processing functions needed by a video playback application to produce the final image for the player window. The video image compositor may perform lens distortion correction on wide-view camera(s) 1370, surround camera(s) 1374, and/or on in-cabin monitoring camera sensors. An in-cabin monitoring camera sensor is preferably monitored by a neural network running on another instance of the advanced SoC, configured to identify in-cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1308 is not required to continuously render new surfaces. Even when the GPU(s) 1308 is powered on and actively performing 3D rendering, the video image compositor may be used to offload the GPU(s) 1308 to improve performance and responsiveness.

The SoC(s) 1304 may further include a mobile industry processor interface (MIPI) camera serial interface for receiving video and input from cameras, a high-speed interface, and/or a video input block that may be used for camera and related pixel input functions. The SoC(s) 1304 may further include an input/output controller(s) that may be controlled by software and may be used for receiving I/O signals that are uncommitted to a specific role.

The SoC(s) 1304 may further include a broad range of peripheral interfaces to enable communication with peripherals, audio codecs, power management, and/or other devices. The SoC(s) 1304 may be used to process data from cameras (e.g., connected over Gigabit Multimedia Serial Link and Ethernet), sensors (e.g., LIDAR sensor(s) 1364, RADAR sensor(s) 1360, etc. that may be connected over Ethernet), data from bus 1302 (e.g., speed of vehicle 1300, steering wheel position, etc.), data from GNSS sensor(s) 1358 (e.g., connected over Ethernet or CAN bus). The SoC(s) 1304 may further include dedicated high-performance mass storage controllers that may include their own DMA engines, and that may be used to free the CPU(s) 1306 from routine data management tasks.

The SoC(s) 1304 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1304 may be faster, more reliable, and even more energy-efficient and space-efficient than conventional systems. For example, the accelerator(s) 1314, when combined with the CPU(s) 1306, the GPU(s) 1308, and the data store(s) 1316, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1320) may include a text and word recognition, allowing the supercomputer to read and understand traffic signs, including signs for which the neural network has not been specifically trained. The DLA may further include a neural network that is able to identify, interpret, and provide semantic understanding of the sign, and to pass that semantic understanding to the path-planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path-planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1308.

In some examples, a CNN for facial recognition and vehicle owner identification may use data from camera sensors to identify the presence of an authorized driver and/or owner of the vehicle 1300. The always-on sensor processing engine may be used to unlock the vehicle when the owner approaches the driver door and turn on the lights, and, in security mode, to disable the vehicle when the owner leaves the vehicle. In this way, the SoC(s) 1304 provide for security against theft and/or carjacking.

In another example, a CNN for emergency vehicle detection and identification may use data from microphones 1396 to detect and identify emergency vehicle sirens. In contrast to conventional systems, which use general classifiers to detect sirens and manually extract features, the SoC(s) 1304 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1358. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1362, until the emergency vehicle(s) passes.

The vehicle may include a CPU(s) 1318 (e.g., discrete CPU(s), or dCPU(s)), that may be coupled to the SoC(s) 1304 via a high-speed interconnect (e.g., PCIe). The CPU(s) 1318 may include an X86 processor, for example. The CPU(s) 1318 may be used to perform any of a variety of functions, including arbitrating potentially inconsistent results between ADAS sensors and the SoC(s) 1304, and/or monitoring the status and health of the controller(s) 1336 and/or infotainment SoC 1330, for example.

The vehicle 1300 may include a GPU(s) 1320 (e.g., discrete GPU(s), or dGPU(s)), that may be coupled to the SoC(s) 1304 via a high-speed interconnect (e.g., NVIDIA's NVLINK). The GPU(s) 1320 may provide additional artificial intelligence functionality, such as by executing redundant and/or different neural networks, and may be used to train and/or update neural networks based on input (e.g., sensor data) from sensors of the vehicle 1300.

The vehicle 1300 may further include the network interface 1324 which may include one or more wireless antennas 1326 (e.g., one or more wireless antennas for different communication protocols, such as a cellular antenna, a Bluetooth antenna, etc.). The network interface 1324 may be used to enable wireless connectivity over the Internet with the cloud (e.g., with the server(s) 1378 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1300 information about vehicles in proximity to the vehicle 1300 (e.g., vehicles in front of, on the side of, and/or behind the vehicle 1300). This functionality may be part of a cooperative adaptive cruise control functionality of the vehicle 1300.

The network interface 1324 may include a SoC that provides modulation and demodulation functionality and enables the controller(s) 1336 to communicate over wireless networks. The network interface 1324 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1300 may further include data store(s) 1328, which may include off-chip (e.g., off the SoC(s) 1304) storage. The data store(s) 1328 may include one or more storage elements including RAM, SRAM, DRAM, VRAM, Flash, hard disks, and/or other components and/or devices that may store at least one bit of data.

The vehicle 1300 may further include GNSS sensor(s) 1358 (e.g., GPS and/or assisted GPS sensors), to assist in mapping, perception, occupancy grid generation, and/or path planning functions. Any number of GNSS sensors 1358 may be used, including, for example and without limitation, a GPS using a USB connector with an Ethernet to serial (RS-232) bridge.

The vehicle 1300 may further include RADAR sensor(s) 1360. The RADAR sensor(s) 1360 may be used by the vehicle 1300 for long-range vehicle detection, even in darkness and/or severe weather conditions. RADAR functional safety levels may be ASIL B. The RADAR sensor(s) 1360 may use the CAN and/or the bus 1302 (e.g., to transmit data generated by the RADAR sensor(s) 1360) for control and to access object tracking data, with access to Ethernet to access raw data, in some examples. A wide variety of RADAR sensor types may be used. For example, and without limitation, the RADAR sensor(s) 1360 may be suitable for front, rear, and side RADAR use. In some example, Pulse Doppler RADAR sensor(s) are used.

The RADAR sensor(s) 1360 may include different configurations, such as long-range with narrow field of view, short-range with wide field of view, short-range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1360 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the surrounding of the vehicle 1300 at higher speeds with minimal interference from traffic in adjacent lanes. The other two antennae may expand the field of view, making it possible to quickly detect vehicles entering or leaving the vehicle's 1300 lane.

Mid-range RADAR systems may include, as an example, a range of up to 1360 m (front) or 80 m (rear), and a field of view of up to 42 degrees (front) or 1350 degrees (rear). Short-range RADAR systems may include, without limitation, RADAR sensors designed to be installed at both ends of the rear bumper. When installed at both ends of the rear bumper, such a RADAR sensor system may create two beams that constantly monitor the blind spot in the rear and next to the vehicle.

Short-range RADAR systems may be used in an ADAS system for blind spot detection and/or lane change assist.

The vehicle 1300 may further include ultrasonic sensor(s) 1362. The ultrasonic sensor(s) 1362, which may be positioned at the front, back, and/or the sides of the vehicle 1300, may be used for park assist and/or to create and update an occupancy grid. A wide variety of ultrasonic sensor(s) 1362 may be used, and different ultrasonic sensor(s) 1362 may be used for different ranges of detection (e.g., 2.5 m, 4 m). The ultrasonic sensor(s) 1362 may operate at functional safety levels of ASIL B.

The vehicle 1300 may include LIDAR sensor(s) 1364. The LIDAR sensor(s) 1364 may be used for object and pedestrian detection, emergency braking, collision avoidance, and/or other functions. The LIDAR sensor(s) 1364 may be functional safety level ASIL B. In some examples, the vehicle 1300 may include multiple LIDAR sensors 1364 (e.g., two, four, six, etc.) that may use Ethernet (e.g., to provide data to a Gigabit Ethernet switch).

In some examples, the LIDAR sensor(s) 1364 may be capable of providing a list of objects and their distances for a 360-degree field of view. Commercially available LIDAR sensor(s) 1364 may have an advertised range of approximately 100 m, with an accuracy of 2 cm-3 cm, and with support for a 100 Mbps Ethernet connection, for example. In some examples, one or more non-protruding LIDAR sensors 1364 may be used. In such examples, the LIDAR sensor(s) 1364 may be implemented as a small device that may be embedded into the front, rear, sides, and/or corners of the vehicle 1300. The LIDAR sensor(s) 1364, in such examples, may provide up to a 120-degree horizontal and 35-degree vertical field-of-view, with a 200 m range even for low-reflectivity objects. Front-mounted LIDAR sensor(s) 1364 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1300. Available 3D flash LIDAR systems include a solid-state 3D staring array LIDAR camera with no moving parts other than a fan (e.g., a non-scanning LIDAR device). The flash LIDAR device may use a five nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1364 may be less susceptible to motion blur, vibration, and/or shock.

The vehicle may further include IMU sensor(s) 1366. The IMU sensor(s) 1366 may be located at a center of the rear axle of the vehicle 1300, in some examples. The IMU sensor(s) 1366 may include, for example and without limitation, an accelerometer(s), a magnetometer(s), a gyroscope(s), a magnetic compass(es), and/or other sensor types. In some examples, such as in six-axis applications, the IMU sensor(s) 1366 may include accelerometers and gyroscopes, while in nine-axis applications, the IMU sensor(s) 1366 may include accelerometers, gyroscopes, and magnetometers.

In some embodiments, the IMU sensor(s) 1366 may be implemented as a miniature, high-performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1366 may enable the vehicle 1300 to estimate heading without requiring input from a magnetic sensor by directly observing and correlating the changes in velocity from GPS to the IMU sensor(s) 1366. In some examples, the IMU sensor(s) 1366 and the GNSS sensor(s) 1358 may be combined in a single integrated unit.

The vehicle may include microphone(s) 1396 placed in and/or around the vehicle 1300. The microphone(s) 1396 may be used for emergency vehicle detection and identification, among other things.

The vehicle may further include any number of camera types, including stereo camera(s) 1368, wide-view camera(s) 1370, infrared camera(s) 1372, surround camera(s) 1374, long-range and/or mid-range camera(s) 1398, and/or other camera types. The cameras may be used to capture image data around an entire periphery of the vehicle 1300. The types of cameras used depends on the embodiments and requirements for the vehicle 1300, and any combination of camera types may be used to provide the necessary coverage around the vehicle 1300. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 13A and FIG. 13B.

The vehicle 1300 may further include vibration sensor(s) 1342. The vibration sensor(s) 1342 may measure vibrations of components of the vehicle, such as the axle(s). For example, changes in vibrations may indicate a change in road surfaces. In another example, when two or more vibration sensors 1342 are used, the differences between the vibrations may be used to determine friction or slippage of the road surface (e.g., when the difference in vibration is between a power-driven axle and a freely rotating axle).

The vehicle 1300 may include an ADAS system 1338. The ADAS system 1338 may include a SoC, in some examples. The ADAS system 1338 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1360, LIDAR sensor(s) 1364, and/or a camera(s). The ACC systems may include longitudinal ACC and/or lateral ACC. Longitudinal ACC monitors and controls the distance to the vehicle immediately ahead of the vehicle 1300 and automatically adjusts the vehicle speed to maintain a safe distance from vehicles ahead. Lateral ACC performs distance keeping, and advises the vehicle 1300 to change lanes when necessary. Lateral ACC is related to other ADAS applications such as LC and CWS.

CACC uses information from other vehicles that may be received via the network interface 1324 and/or the wireless antenna(s) 1326 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication links. In general, the V2V communication concept provides information about the immediately preceding vehicles (e.g., vehicles immediately ahead of and in the same lane as the vehicle 1300), while the I2V communication concept provides information about traffic farther ahead. CACC systems may include either or both I2V and V2V information sources. Given the information of the vehicles ahead of the vehicle 1300, CACC may be more reliable, and it has potential to improve traffic flow smoothness and reduce congestion on the road.

FCW systems are designed to alert the driver to a hazard, so that the driver may take corrective action. FCW systems use a front-facing camera and/or RADAR sensor(s) 1360, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1360, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1300 crosses lane markings. An LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1300 if the vehicle 1300 starts to exit the lane.

BSW systems detect and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1360, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1300 is backing up. Some RCTW systems include AEB to ensure that the vehicle brakes are applied to avoid a crash. RCTW systems may use one or more rear-facing RADAR sensor(s) 1360, coupled to a dedicated processor, DSP, FPGA, and/or ASIC, that is electrically coupled to driver feedback, such as a display, speaker, and/or vibrating component.

Conventional ADAS systems may be prone to false positive results, which may be annoying and distracting to a driver, but typically are not catastrophic, because the ADAS systems alert the driver and allow the driver to decide whether a safety condition truly exists and act accordingly. However, in an autonomous vehicle 1300, the vehicle 1300 itself must, in the case of conflicting results, decide whether to heed the result from a primary computer or a secondary computer (e.g., a first controller 1336 or a second controller 1336). For example, in some embodiments, the ADAS system 1338 may be a backup and/or secondary computer for providing perception information to a backup computer rationality module. The backup computer rationality monitor may run a redundant diverse software on hardware components to detect faults in perception and dynamic driving tasks. Outputs from the ADAS system 1338 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output can be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1304.

In other examples, ADAS system 1338 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity make the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware used by the primary computer is not causing material error.

In some examples, the output of the ADAS system 1338 may be fed into the primary computer's perception block and/or the primary computer's dynamic driving task block. For example, if the ADAS system 1338 indicates a forward crash warning due to an object immediately ahead, the perception block may use this information when identifying objects. In other examples, the secondary computer may have its own neural network that is trained and thus reduces the risk of false positives, as described herein.

The vehicle 1300 may further include the infotainment SoC 1330 (e.g., an in-vehicle infotainment system (IVI)). Although illustrated and described as a SoC, the infotainment system may not be a SoC, and may include two or more discrete components. The infotainment SoC 1330 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle-related information such as fuel level, total distance covered, brake fuel level, oil level, door open/close, air filter information, etc.) to the vehicle 1300. For example, the infotainment SoC 1330 may include radios, disk players, navigation systems, video players, USB and Bluetooth connectivity, carputers, in-car entertainment, Wi-Fi, steering wheel audio controls, hands-free voice control, a heads-up display (HUD), an HMI display 1334, a telematics device, a control panel (e.g., for controlling and/or interacting with various components, features, and/or systems), and/or other components. The infotainment SoC 1330 may further be used to provide information (e.g., visual and/or audible) to a user(s) of the vehicle, such as information from the ADAS system 1338, autonomous driving information such as planned vehicle maneuvers, trajectories, surrounding environment information (e.g., intersection information, vehicle information, road information, etc.), and/or other information.

The infotainment SoC 1330 may include GPU functionality. The infotainment SoC 1330 may communicate over the bus 1302 (e.g., CAN bus, Ethernet, etc.) with other devices, systems, and/or components of the vehicle 1300. In some examples, the infotainment SoC 1330 may be coupled to a supervisory MCU such that the GPU of the infotainment system may perform some self-driving functions in the event that the primary controller(s) 1336 (e.g., the primary and/or backup computers of the vehicle 1300) fail. In such an example, the infotainment SoC 1330 may put the vehicle 1300 into a chauffeur to safe-stop mode, as described herein.

The vehicle 1300 may further include an instrument cluster 1332 (e.g., a digital dash, an electronic instrument cluster, a digital instrument panel, etc.). The instrument cluster 1332 may include a controller and/or supercomputer (e.g., a discrete controller or supercomputer). The instrument cluster 1332 may include a set of instrumentation such as a speedometer, fuel level, oil pressure, tachometer, odometer, turn indicators, gearshift position indicator, seatbelt warning light(s), parking-brake warning light(s), engine-malfunction light(s), airbag (SRS) system information, lighting controls, safety system controls, navigation information, etc. In some examples, information may be displayed and/or shared among the infotainment SoC 1330 and the instrument cluster 1332. In other words, the instrument cluster 1332 may be included as part of the infotainment SoC 1330, or vice versa.

Figure 13D:
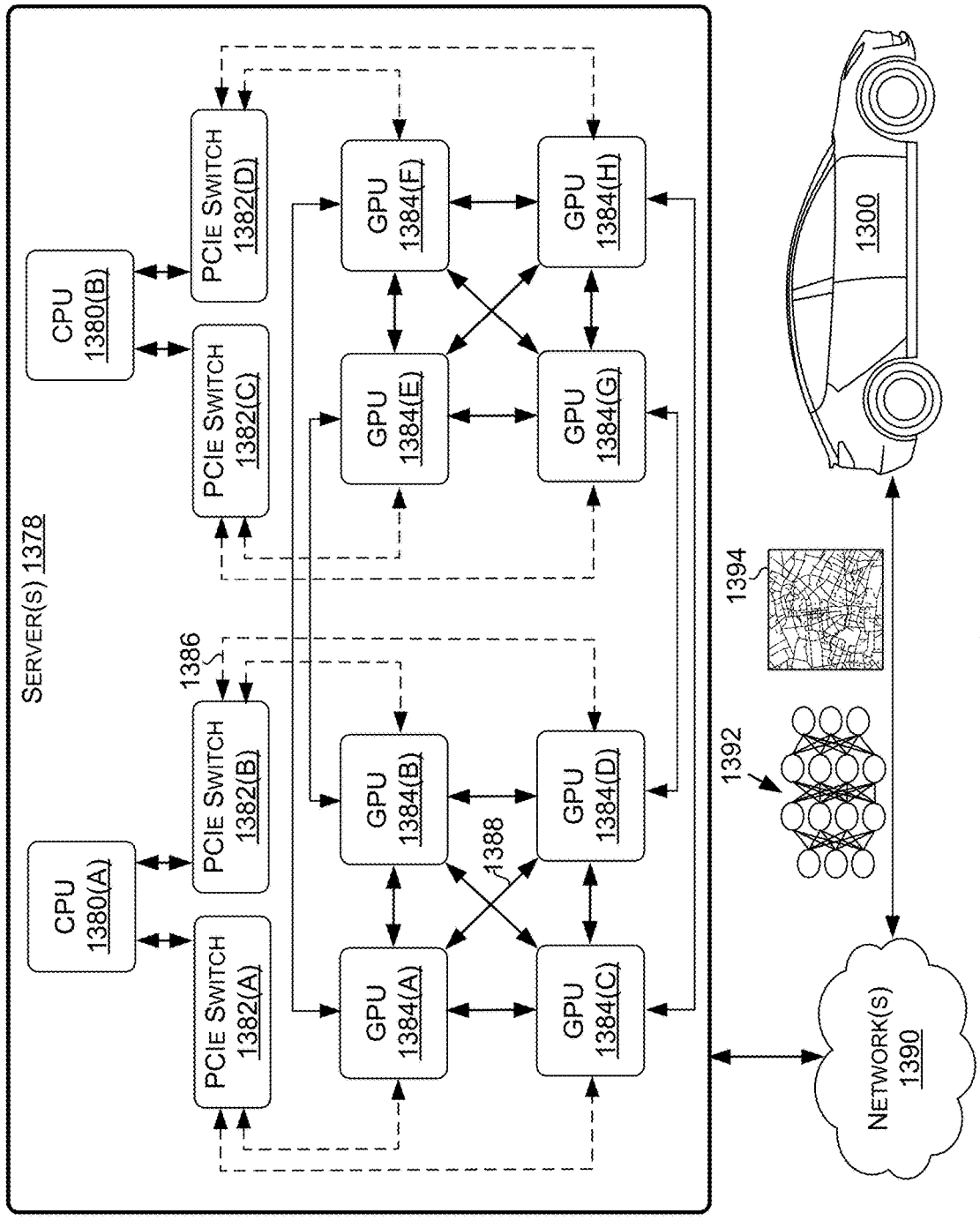
FIG. 13D is a system diagram for communication between cloud-based server(s) and the example autonomous vehicle of FIG. 13A, in accordance with some embodiments of the present disclosure.

FIG. 13D is a system diagram for communication between cloud-based server(s) and the example autonomous vehicle 1300 of FIG. 13A, in accordance with some embodiments of the present disclosure. The system 1376 may include server(s) 1378, network(s) 1390, and vehicles, including the vehicle 1300. The server(s) 1378 may include a plurality of GPUs 1384(A)-1384(H) (collectively referred to herein as GPUs 1384), PCIe switches 1382(A)-1382(H) (collectively referred to herein as PCIe switches 1382), and/or CPUs 1380(A)-1380(B) (collectively referred to herein as CPUs 1380). The GPUs 1384, the CPUs 1380, and the PCIe switches may be interconnected with high-speed interconnects such as, for example and without limitation, NVLink interfaces 1388 developed by NVIDIA and/or PCIe connections 1386. In some examples, the GPUs 1384 are connected via NVLink and/or NVSwitch SoC and the GPUs 1384 and the PCIe switches 1382 are connected via PCIe interconnects. Although eight GPUs 1384, two CPUs 1380, and two PCIe switches are illustrated, this is not intended to be limiting. Depending on the embodiment, each of the server(s) 1378 may include any number of GPUs 1384, CPUs 1380, and/or PCIe switches. For example, the server(s) 1378 may each include eight, sixteen, thirty-two, and/or more GPUs 1384.

The server(s) 1378 may receive, over the network(s) 1390 and from the vehicles, image data representative of images showing unexpected or changed road conditions, such as recently commenced roadwork. The server(s) 1378 may transmit, over the network(s) 1390 and to the vehicles, neural networks 1392, updated neural networks 1392, and/or map information 1394, including information regarding traffic and road conditions. The updates to the map information 1394 may include updates for the HD map 1322, such as information regarding construction sites, potholes, detours, flooding, and/or other obstructions. In some examples, the neural networks 1392, the updated neural networks 1392, and/or the map information 1394 may have resulted from new training and/or experiences represented in data received from any number of vehicles in the environment, and/or based on training performed at a datacenter (e.g., using the server(s) 1378 and/or other servers).

The server(s) 1378 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 1390, and/or the machine learning models may be used by the server(s) 1378 to remotely monitor the vehicles.

In some examples, the server(s) 1378 may receive data from the vehicles and apply the data to up-to-date real-time neural networks for real-time intelligent inferencing. The server(s) 1378 may include deep-learning supercomputers and/or dedicated AI computers powered by GPU(s) 1384, such as a DGX and DGX Station machines developed by NVIDIA. However, in some examples, the server(s) 1378 may include deep learning infrastructure that use only CPU-powered datacenters.

The deep-learning infrastructure of the server(s) 1378 may be capable of fast, real-time inferencing, and may use that capability to evaluate and verify the health of the processors, software, and/or associated hardware in the vehicle 1300. For example, the deep-learning infrastructure may receive periodic updates from the vehicle 1300, such as a sequence of images and/or objects that the vehicle 1300 has located in that sequence of images (e.g., via computer vision and/or other machine learning object classification techniques). The deep-learning infrastructure may run its own neural network to identify the objects and compare them with the objects identified by the vehicle 1300 and, if the results do not match and the infrastructure concludes that the AI in the vehicle 1300 is malfunctioning, the server(s) 1378 may transmit a signal to the vehicle 1300 instructing a fail-safe computer of the vehicle 1300 to assume control, notify the passengers, and complete a safe parking maneuver.

For inferencing, the server(s) 1378 may include the GPU(s) 1384 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 14:
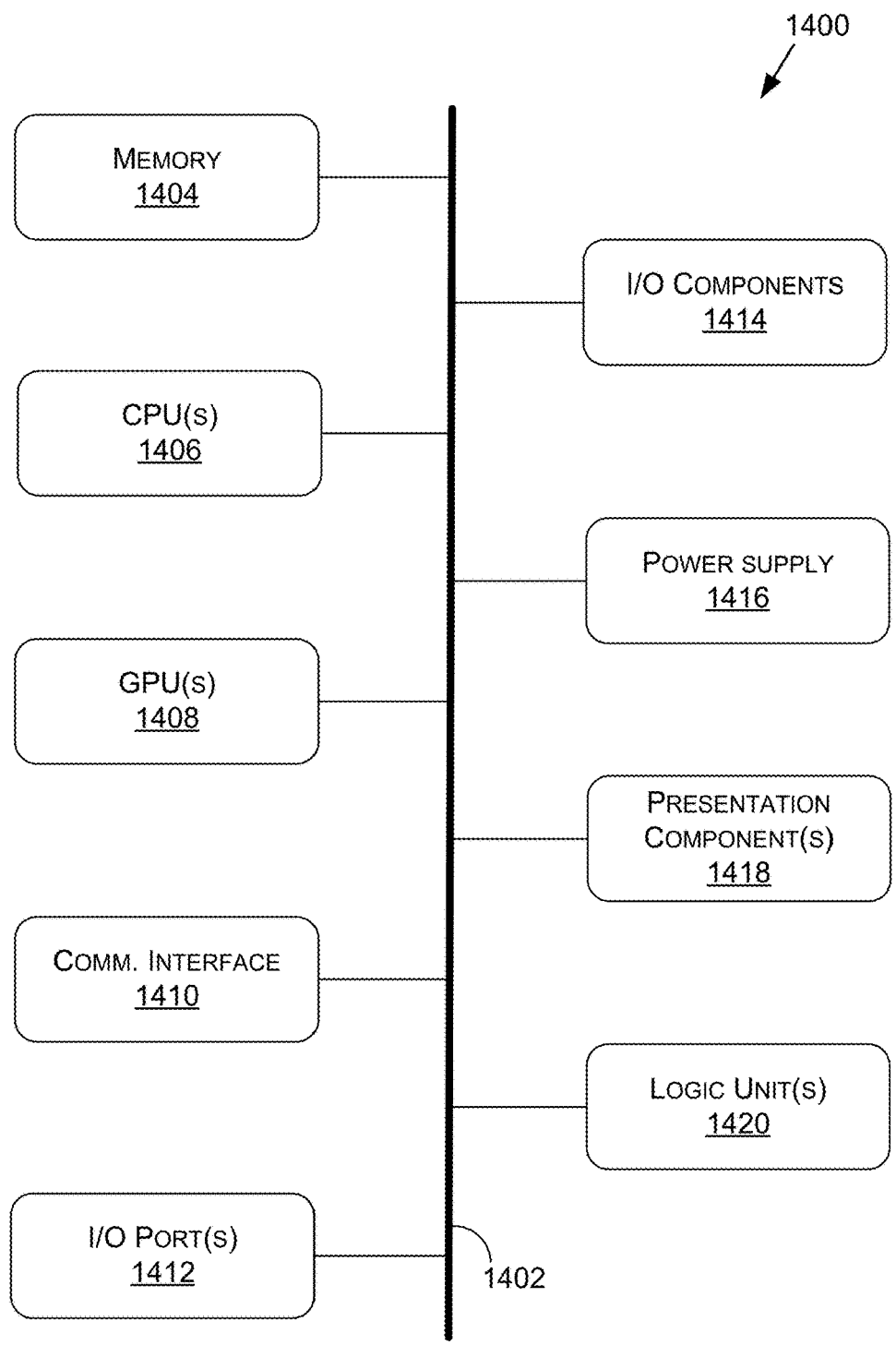
FIG. 14 is a block diagram of an example computing device suitable for use in implementing some embodiments of the present disclosure.

FIG. 14 is a block diagram of an example computing device(s) 1400 suitable for use in implementing some embodiments of the present disclosure. Computing device 1400 may include an interconnect system 1402 that directly or indirectly couples the following devices: memory 1404, one or more central processing units (CPUs) 1406, one or more graphics processing units (GPUs) 1408, a communication interface 1410, I/O ports 1412, input/output components 1414, a power supply 1416, one or more presentation components 1418 (e.g., display(s)), and one or more logic units 1420.

Although the various blocks of FIG. 14 are shown as connected via the interconnect system 1402 with lines, this is not intended to be limiting and is for clarity only. For example, in some embodiments, a presentation component 1418, such as a display device, may be considered an I/O component 1414 (e.g., if the display is a touch screen). As another example, the CPUs 1406 and/or GPUs 1408 may include memory (e.g., the memory 1404 may be representative of a storage device in addition to the memory of the GPUs 1408, the CPUs 1406, and/or other components). In other words, the computing device of FIG. 14 is merely illustrative. Distinction is not made between such categories as "workstation," "server," "laptop," "desktop," "tablet," "client device," "mobile device," "hand-held device," "game console," "electronic control unit (ECU)," "virtual reality system," "augmented reality system," and/or other device or system types, as all are contemplated within the scope of the computing device of FIG. 14.

The interconnect system 1402 may represent one or more links or busses, such as an address bus, a data bus, a control bus, or a combination thereof. The interconnect system 1402 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1406 may be directly connected to the memory 1404. Further, the CPU 1406 may be directly connected to the GPU 1408. Where there is direct, or point-to-point, connection between components, the interconnect system 1402 may include a PCIe link to carry out the connection. In these examples, a PCI bus need not be included in the computing device 1400.

The memory 1404 may include any of a variety of computer-readable media. The computer-readable media may be any available media that may be accessed by the computing device 1400. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1404 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computing device 1400. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1406 may be configured to execute at least some of the computer-readable instructions to control one or more components of the computing device 1400 to perform one or more of the methods and/or processes described herein. The CPU(s) 1406 may each include one or more cores (e.g., one, two, four, eight, twenty-eight, seventy-two, etc.) that are capable of handling a multitude of software threads simultaneously. The CPU(s) 1406 may include any type of processor, and may include different types of processors depending on the type of computing device 1400 implemented (e.g., processors with fewer cores for mobile devices and processors with more cores for servers). For example, depending on the type of computing device 1400, the processor may be an Advanced RISC Machines (ARM) processor implemented using Reduced Instruction Set Computing (RISC) or an x86 processor implemented using Complex Instruction Set Computing (CISC). The computing device 1400 may include one or more CPUs 1406 in addition to one or more microprocessors or supplementary co-processors, such as math co-processors.

In addition to or alternatively from the CPU(s) 1406, the GPU(s) 1408 may be configured to execute at least some of the computer-readable instructions to control one or more components of the computing device 1400 to perform one or more of the methods and/or processes described herein. One or more of the GPU(s) 1408 may be an integrated GPU (e.g., with one or more of the CPU(s) 1406 and/or one or more of the GPU(s) 1408 may be a discrete GPU. In embodiments, one or more of the GPU(s) 1408 may be a coprocessor of one or more of the CPU(s) 1406. The GPU(s) 1408 may be used by the computing device 1400 to render graphics (e.g., 3D graphics) or perform general purpose computations. For example, the GPU(s) 1408 may be used for General-Purpose computing on GPUs (GPGPU). The GPU(s) 1408 may include hundreds or thousands of cores that are capable of handling hundreds or thousands of software threads simultaneously. The GPU(s) 1408 may generate pixel data for output images in response to rendering commands (e.g., rendering commands from the CPU(s) 1406 received via a host interface). The GPU(s) 1408 may include graphics memory, such as display memory, for storing pixel data or any other suitable data, such as GPGPU data. The display memory may be included as part of the memory 1404. The GPU(s) 1408 may include two or more GPUs operating in parallel (e.g., via a link). The link may directly connect the GPUs (e.g., using NVLINK) or may connect the GPUs through a switch (e.g., using NVSwitch). When combined together, each GPU 1408 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1406 and/or the GPU(s) 1408, the logic unit(s) 1420 may be configured to execute at least some of the computer-readable instructions to control one or more components of the computing device 1400 to perform one or more of the methods and/or processes described herein. In embodiments, the CPU(s) 1406, the GPU(s) 1408, and/or the logic unit(s) 1420 may discretely or jointly perform any combination of the methods, processes and/or portions thereof. One or more of the logic units 1420 may be part of and/or integrated in one or more of the CPU(s) 1406 and/or the GPU(s) 1408 and/or one or more of the logic units 1420 may be discrete components or otherwise external to the CPU(s) 1406 and/or the GPU(s) 1408. In embodiments, one or more of the logic units 1420 may be a coprocessor of one or more of the CPU(s) 1406 and/or one or more of the GPU(s) 1408.

Examples of the logic unit(s) 1420 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), I/O elements, peripheral component interconnect (PCI) or peripheral component interconnect express (PCIe) elements, and/or the like.

The communication interface 1410 may include one or more receivers, transmitters, and/or transceivers that enable the computing device 1400 to communicate with other computing devices via an electronic communication network, including wired and/or wireless communications. The communication interface 1410 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 1412 may enable the computing device 1400 to be logically coupled to other devices including the I/O components 1414, the presentation component(s) 1418, and/or other components, some of which may be built into (e.g., integrated in) the computing device 1400. Illustrative I/O components 1414 include a microphone, mouse, keyboard, joystick, game pad, game controller, satellite dish, scanner, printer, wireless device, etc. The I/O components 1414 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1400. The computing device 1400 may include depth cameras, such as stereoscopic camera systems, infrared camera systems, RGB camera systems, touchscreen technology, and combinations of these, for gesture detection and recognition. Additionally, the computing device 1400 may include accelerometers or gyroscopes (e.g., as part of an inertia measurement unit (IMU)) that enable detection of motion. In some examples, the output of the accelerometers or gyroscopes may be used by the computing device 1400 to render immersive augmented reality or virtual reality.

The power supply 1416 may include a hard-wired power supply, a battery power supply, or a combination thereof. The power supply 1416 may provide power to the computing device 1400 to enable the components of the computing device 1400 to operate.

The presentation component(s) 1418 may include a display (e.g., a monitor, a touch screen, a television screen, a heads-up-display (HUD), other display types, or a combination thereof), speakers, and/or other presentation components. The presentation component(s) 1418 may receive data from other components (e.g., the GPU(s) 1408, the CPU(s) 1406, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to codes that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method, comprising:
    receiving an image representing a subject and a restraint device corresponding to the subject;
    performing an initial classification of areas of the image based at least in part on one or more groups of pixels comprising at least one edge of the restraint device;
    applying a set of constraints to the areas of the image to refine the initial classification to obtain a refined classification;
    generating a model indicative of an application of the restraint device based at least in part on the refined classification; and,
    controlling, using one or more circuits, functionality of at least one subsystem of a vehicle based at least in part on the model.

2. The method of claim 1, wherein the initial classification is performed by using a pixel and a plurality of neighboring pixels along a specified direction to determine a set of pixels that are part of the restraint device.

3. The method of claim 2, wherein determining the set of pixels that are part of the restraint device is based, at least in part, on intensity levels of the pixel and the plurality of neighboring pixels along the specified direction.

4. The method of claim 1, wherein the restraint device comprises one or more attributes including at least: a width size of the restraint device and one or more anchors for the restraint device in a vehicle.

5. The method of claim 1, wherein the image is captured by a camera that comprises one or more configurations including at least: calibrations of the camera, camera pose, and a type of camera lens.

6. The method of claim 1, further comprising: activating a signal to indicate that the restraint device is in an improper position relative to the subject.

7. The method of claim 1, further comprising: using the model to determine a position of the restraint device relative to the subject, wherein the model approximates a shape of the restraint device.

8. A system, comprising:
one or more processors;
memory that stores computer-executable instructions that are executable by the one or more processors to cause the system to:
perform an initial classification of areas of an image based at least in part on one or more groups of pixels comprising at least one edge of a restraint device applied to a subject;
apply a set of constraints to the areas of the image to refine the initial classification to obtain a refined classification;
generate a model indicative of an application of the restraint device based at least in part on the refined classification; and
control, using one or more circuits, functionality of at least one subsystem of a vehicle based at least in part on the model.

9. The system of claim 8, wherein the model comprises a polynomial curve with coefficients calculated to match a shape of the restraint device.

10. The system of claim 8, wherein:
the system comprises a parallel processing unit (PPU);
the image comprises one or more areas; and
the one or more areas are classified using one or more threads of the PPU in parallel.

11. The system of claim 8, wherein the model indicates if the restraint device is applied to the subject correctly.

12. The system of claim 8, wherein the set of constraints include at least a range of widths.

13. The system of claim 8, wherein the areas of the image correspond to a grouping of one or more pixels of the image.

14. The system of claim 8, wherein the image is obtained from one or more networks from one or more systems of a vehicle.

15. The system of claim 14, wherein the model of the restraint device is provided to the one or more systems of the vehicle through the one or more networks.

16. A vehicle, comprising:
a propulsion system;
an image capturing device able to capture images of at least one passenger of the vehicle; and
a computer system comprising instructions executable by the computer system to at least:
access an image representing a subject and a restraint device applied to the subject;
perform an initial classification of areas of the image as representing based at least in part on one or more groups of pixels comprising at least one edge of the restraint device;
apply a set of constraints to the areas of the image to refine the initial classification to obtain a refined classification;
generate a model indicative of an application of the restraint device based at least in part on the refined classification; and
control functionality of at least one subsystem of the vehicle based at least in part on the model.

17. The vehicle of claim 16, wherein the restraint device is a seatbelt of the vehicle.

18. The vehicle of claim 16, wherein the one subsystem of the vehicle is a warning system that indicates whether the restraint device is worn and applied correctly.

19. The vehicle of claim 16, wherein the one subsystem of the vehicle sends signals to control propulsion of the vehicle through the propulsion system.

20. The vehicle of claim 16, wherein the one subsystem of the vehicle transmits indications of whether the restraint device is worn and applied correctly to one or more remote systems.

* * * * *